(12) United States Patent
Sasaki et al.

(10) Patent No.: US 9,653,100 B1
(45) Date of Patent: May 16, 2017

(54) MAGNETIC HEAD FOR PERPENDICULAR MAGNETIC RECORDING CAPABLE OF PREVENTING UNWANTED ERASURE

(71) Applicants: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US); Kenichi Takano, Milpitas, CA (US)

(72) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US); Kenichi Takano, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/945,004

(22) Filed: Nov. 18, 2015

(51) Int. Cl.
*G11B 5/127* (2006.01)
*G11B 5/39* (2006.01)
*G11B 5/17* (2006.01)

(52) U.S. Cl.
CPC ............ *G11B 5/1278* (2013.01); *G11B 5/17* (2013.01); *G11B 5/3912* (2013.01)

(58) Field of Classification Search
None
See application file for complete search history.

(56) References Cited

U.S. PATENT DOCUMENTS

| | | | |
|---|---|---|---|
| 8,385,019 B1 | 2/2013 | Sasaki et al. | |
| 8,988,823 B1 * | 3/2015 | Sasaki | G11B 5/11 360/125.3 |
| 9,214,165 B1 * | 12/2015 | Liu | G11B 5/11 |
| 9,230,568 B1 * | 1/2016 | Ikegawa | G11B 5/3116 |
| 2013/0283601 A1 * | 10/2013 | Sasaki | G11B 5/1278 29/603.07 |
| 2013/0308227 A1 * | 11/2013 | Sasaki | G11B 5/1278 360/123.12 |
| 2015/0170682 A1 * | 6/2015 | Sasaki | G11B 5/3123 360/123.12 |

* cited by examiner

*Primary Examiner* — Will J Klimowicz
(74) *Attorney, Agent, or Firm* — Oliff PLC

(57) ABSTRACT

A magnetic head includes a coil, a main pole, a write shield, and a return path section. The coil includes a coil element located on the trailing side of the main pole. The coil element has a front end face facing toward the medium facing surface. The return path section includes a first portion, a second portion, and an intermediate film interposed between the first portion and the second portion. Part of the first portion is interposed between the medium facing surface and the front end face of the coil element. Part of the second portion is interposed between the first portion and the front end face of the coil element.

17 Claims, 23 Drawing Sheets

MAGNETIC HEAD FOR PERPENDICULAR MAGNETIC RECORDING CAPABLE OF PREVENTING UNWANTED ERASURE

BACKGROUND OF THE INVENTION

1. Field of the Invention

The present invention relates to a magnetic head for perpendicular magnetic recording for use to write data on a recording medium by means of a perpendicular magnetic recording system.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main' pole has an end face located in a medium facing surface facing a recording medium. The coil produces a magnetic field corresponding to data to be written on the recording medium. The main pole passes a magnetic flux corresponding to the magnetic field produced by the coil, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the occurrence of unwanted erasure.

In order to prevent the occurrence of unwanted erasure induced by a skew and achieve higher recording densities, it is effective to configure the main pole so that the thickness of its portion near the medium facing surface decreases with increasing proximity to the medium facing surface, and also provide a write shield that has an end face located in the medium facing surface and surrounding the end face of the main pole.

In a magnetic head including the write shield, there is typically provided a return path section for connecting the write shield to a part of the main pole located away from the medium facing surface. The write shield, the return path section and the main pole define a space for a part of the coil to pass therethrough. The write shield and the return path section have the function of capturing a magnetic flux that is produced from the end face of the main pole and spreads in directions other than a direction perpendicular to the plane of the recording medium, thereby preventing the magnetic flux from reaching the recording medium. The write shield and the return path section also have the function of allowing a magnetic flux that has been produced from the end face of the main pole and has magnetized a part of the recording medium to flow back to the main pole.

The position of an end of a record bit to be recorded on the recording medium is determined by the position of the trailing-side edge of the end face of the main pole located in the medium facing surface. In order to define the position of the end of the record bit accurately, it is thus important that the write shield include a trailing shield which is located on the trailing side relative to the main pole.

With increases in frequency of write signals to achieve higher recording densities, it is required of the magnetic head that the write current flowing through the coil should exhibit a rapid rise. To meet such a requirement, it is effective to reduce the length of a magnetic path that passes through the write shield, the return path section and the main pole. To achieve this, it is effective to reduce the distance between the medium facing surface and an end of the coil that is closest to the medium facing surface.

U.S. Pat. No. 8,385,019 B1 discloses a magnetic head having the following features. The magnetic head includes a main pole, a coil, a write shield and a return path section. The main pole has a top surface including an inclined portion and a flat portion, the inclined portion being located closer to the medium facing surface than is the flat portion. The inclined portion is inclined with respect to a direction perpendicular to the medium facing surface. The flat portion extends in a direction substantially perpendicular to the medium facing surface. The write shield includes a trailing shield. The coil includes a coil element located on the trailing side relative to the main pole, the coil element extending to pass through a space defined by the main pole, the trailing shield and the return path section. The coil element has a first inclined surface inclined with respect to the medium facing surface. The trailing shield has a second inclined surface. The second inclined surface includes a first portion opposed to the inclined portion of the top surface of the main pole, and a second portion opposed to the first inclined surface of the coil element. This magnetic head allows a reduction in length of the magnetic path passing through the trailing shield, the return path section and the main pole.

However, the magnetic head disclosed in U.S. Pat. No. 8,385,019 B1 has room for improvement in the following respects. In the manufacturing method for this magnetic head, an insulating layer is formed to cover the first inclined surface of the coil element, and then a magnetic layer to become the trailing shield is formed on the insulating layer by plating. In this case, a region that lies below the magnetic layer and coincides with the magnetic layer when viewed in a direction perpendicular to the top surface of the substrate includes a first region in which the coil element is absent and a second region in which the coil element is present. In the first region, the magnetic layer exhibits crystal growth in the direction perpendicular to the top surface of the substrate. In the second region, the magnetic layer exhibits crystal growth in the direction perpendicular to the first inclined surface. As a result, the trailing shield includes two portions having different crystal growth directions. Such a trailing shield has a greater number of grain boundaries and defects. In such a trailing shield, magnetization rotation and domain wall displacement cannot smoothly proceed, and leakage magnetic field is thus likely to occur from the end face of the trailing shield toward the outside of the medium facing surface. This results in the problem of the occurrence of unwanted erasure.

The aforementioned problem occurs also when the coil element has a front end face parallel to the medium facing surface, instead of the first inclined surface.

OBJECT AND SUMMARY OF THE INVENTION

It is an object of the present invention to provide a magnetic head for perpendicular magnetic recording and its manufacturing method that can prevent the occurrence of unwanted erasure.

A magnetic head for perpendicular magnetic recording of the present invention includes a medium facing surface configured to face a recording medium, a coil for producing a magnetic field corresponding to data to be written on the recording medium, a main pole, a write shield formed of a magnetic material, a gap section formed of a nonmagnetic material, and a first return path section. The main pole has an end face located in the medium facing surface. The main pole is configured to pass a magnetic flux corresponding to the magnetic field produced by the coil, and to produce a write magnetic field for use to write data on the recording medium by means of the perpendicular magnetic recording system. The gap section is located between the main pole and the write shield. The first return path section is located on the front side in the direction of travel of the recording medium relative to the main pole.

The first return path section connects the write shield to a part of the main pole located away from the medium facing surface so that a first space is defined by the main pole, the gap section, the write shield and the first return path section.

The coil includes a first coil element extending to pass through the first space. The first coil element is a part of the winging of the coil. The first coil element has a front end face facing toward the medium facing surface. The first return path section includes a first portion formed of a first magnetic material, a second portion formed of a second magnetic material, and a first intermediate film interposed between the first portion and the second portion. The second portion is located farther from the medium facing surface than is the first portion. At least part of the first portion is interposed between the medium facing surface and the front end face of the first coil element. At least part of the second portion is interposed between the first portion and the front end face of the first coil element. A thickness of the first intermediate film in a direction perpendicular to the medium facing surface is smaller than a maximum thickness of the first portion in the direction perpendicular to the medium facing surface.

In the magnetic head of the present invention, the first intermediate film may contain an element constituting the first magnetic material, and oxygen. Alternatively, the first intermediate film may be formed of a nonmagnetic material.

In the magnetic head of the present invention, the second magnetic material may be higher in saturation flux density than the first magnetic material.

In the magnetic head of the present invention, the write shield may include a top shield located on the front side in the direction of travel of the recording medium relative to the main pole. In this case, the first portion of the first return path section may be located on the front side in the direction of travel of the recording medium relative to the top shield.

In the magnetic head of the present invention, the front end face of the first coil element may have a first end closest to the main pole and a second end opposite to the first end. In this case, the front end face may be inclined with respect to the medium facing surface and the direction perpendicular to the medium facing surface such that the second end is at a greater distance from the medium facing surface than is the first end.

In the magnetic head of the present invention, the first return path section may further include a third portion and a second intermediate film, the third portion being formed of the second magnetic material and interposed between the medium facing surface and the first portion, the second intermediate film being interposed between the first portion and the third portion. A thickness of each of the third portion and the second intermediate film in the direction perpendicular to the medium facing surface is smaller than the maximum thickness of the first portion in the direction perpendicular to the medium facing surface.

The magnetic head of the present invention may further include a second return path section formed of a magnetic material and located on the rear side in the direction of travel of the recording medium relative to the main pole. The second return path section connects the write shield to a part of the main pole located away from the medium facing surface so that a second space is defined by the main pole, the gap section, the write shield and the second return path section. In this case, the coil may include a second coil element extending to pass through the second space. The second coil element is a part of the winding of the coil.

When the magnetic head of the present invention is configured so that: the write shield includes the top shield; the first portion of the first return path section is located on the front side in the direction of travel of the recording medium relative to the top shield; and the front end face of the first coil element is inclined with respect to the medium facing surface and the direction perpendicular to the medium facing surface, the first return path section may further include a connection section having a columnar shape and connecting the second portion to the part of the main pole located away from the medium facing surface. In this case, the magnetic head may further include an insulating film interposed between the connection section and the first coil element and between the main pole and the first coil element. The first coil element, the insulating film and the connection section may have respective top surfaces coplanar with each other.

A manufacturing method for the magnetic head of the present invention includes the steps of: forming the coil; forming the main pole; forming the write shield; forming the gap section; and forming the first return path section.

The step of forming the first return path section may include the steps of: forming a first magnetic layer by plating, the first magnetic layer being formed of the first magnetic material and including the first portion; and forming a second magnetic layer by plating after the first magnetic layer is formed, the second magnetic layer being formed of the second magnetic material and including the second portion.

In the manufacturing method for the magnetic head of the present invention, the first intermediate film may contain an element constituting the first magnetic material, and oxygen. In this case, the first intermediate film may be formed by oxidation of a part of the first magnetic layer after the first magnetic layer is formed, the part of the first magnetic layer including a surface of the first magnetic layer.

In the manufacturing method for the magnetic head of the present invention, the first intermediate film may be formed of a nonmagnetic material. In this case, the step of forming the first return path section may further include the step of forming the first intermediate film between the step of forming the first magnetic layer and the step of forming the second magnetic layer.

In the manufacturing method for the magnetic head of the present invention, the first return path section may further include a third portion and a second intermediate film, the third portion being formed of the second magnetic material and interposed between the medium facing surface and the first portion, the second intermediate film being interposed between the first portion and the third portion. A thickness of each of the third portion and the second intermediate film in the direction perpendicular to the medium facing surface is smaller than the maximum thickness of the first portion in the direction perpendicular to the medium facing surface. In this case, the second magnetic layer may be formed to include the third portion.

In the manufacturing method for the magnetic head of the present invention, the write shield may include a top shield located on the front side in the direction of travel of the recording medium relative to the main pole. In this case, the first portion of the first return path section may be located on the front side in the direction of travel of the recording medium relative to the top shield. The front end face of the first coil element may have a first end closest to the main pole and a second end opposite to the first end. In this case, the front end face may be inclined with respect to the medium facing surface and the direction perpendicular to the medium facing surface such that the second end is at a greater distance from the medium facing surface than is the first end. The first return path section may further include a connection section having a columnar shape and connecting the second portion to the part of the main pole located away from the medium facing surface. In this case, the magnetic head may further include an insulating film interposed between the connection section and the first coil element and between the main pole and the first coil element. The first coil element, the insulating film and the connection section may have respective top surfaces coplanar with each other.

Where the magnetic head to be manufactured by the manufacturing method of the present invention has the above-described configuration, the step of forming the write shield may include the step of forming the top shield after the step of forming the main pole, and the step of forming the first return path section may further include the step of forming an initial connection section after the step of forming the top shield. The manufacturing method for the magnetic head may further include the step of forming an initial insulating film to cover the top shield and the initial connection section after the step of forming the initial connection section. In this case, the step of forming the coil may include the steps of: forming an initial coil element after the step of forming the initial insulating film; polishing the initial coil element, the initial insulating film and the initial connection section so that the initial insulating film becomes the insulating film, the initial connection section becomes the connection section, and the top surfaces of the initial coil element, the insulating film and the connection section become even with each other; and etching the initial coil element to provide the initial coil element with the front end face and thereby make the initial coil element into the first coil element.

In the magnetic head of the present invention, at least part of the first portion of the first return path section is interposed between the medium facing surface and the front end face of the first coil element, and at least part of the second portion of the first return path section is interposed between the first portion and the front end face of the first coil element. By virtue of such a configuration, it is possible to form the first portion such that most part of the first portion has a uniform crystal growth direction. The present invention thereby makes it possible to prevent the occurrence of unwanted erasure.

Other objects, features and advantages of the present invention will become fully apparent from the following description.

DETAILED DESCRIPTION OF THE PREFERRED EMBODIMENTS

First Embodiment

Figure 2:
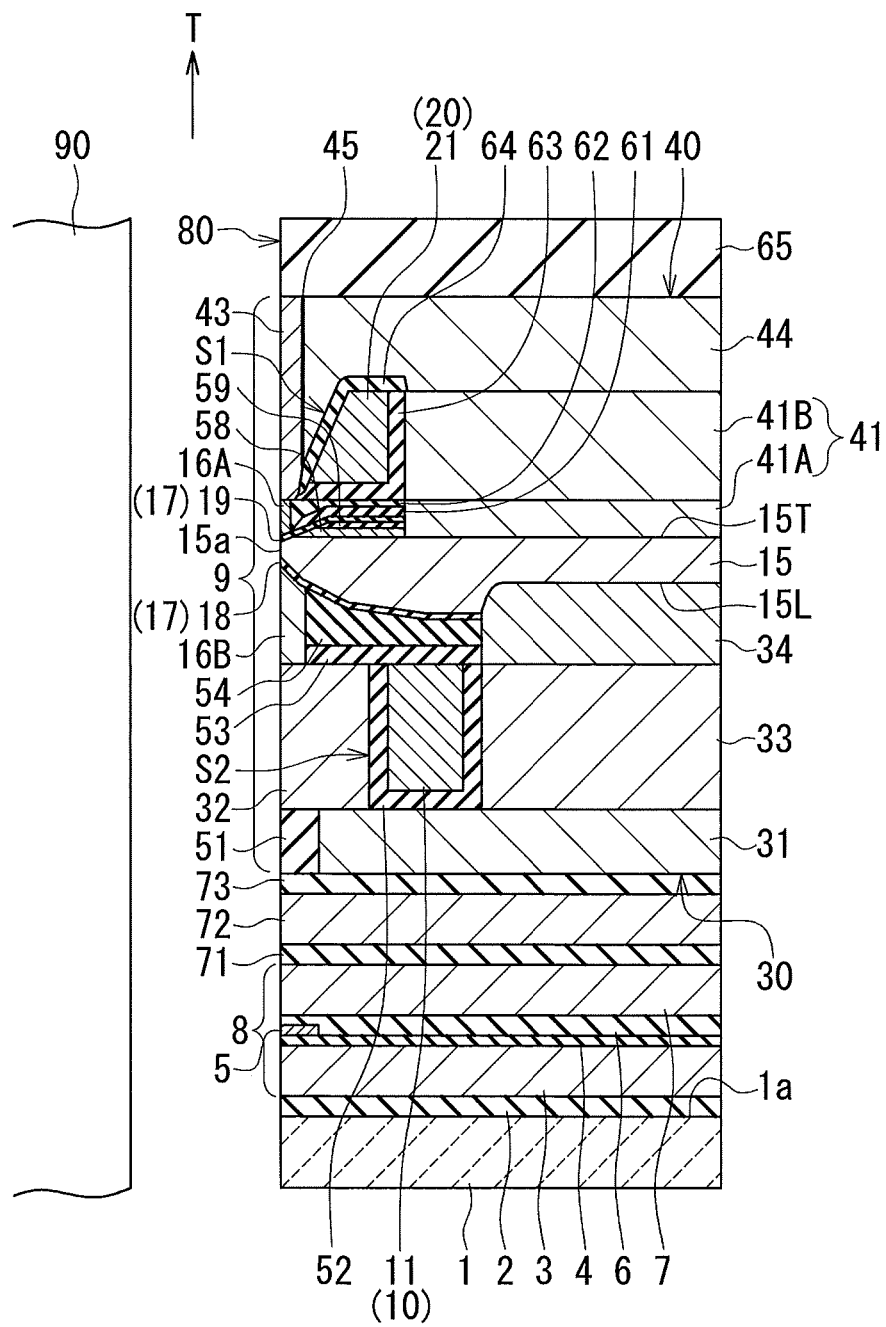
FIG. 2 is a cross-sectional view of the magnetic head according to the first embodiment of the invention.
Figure 3:
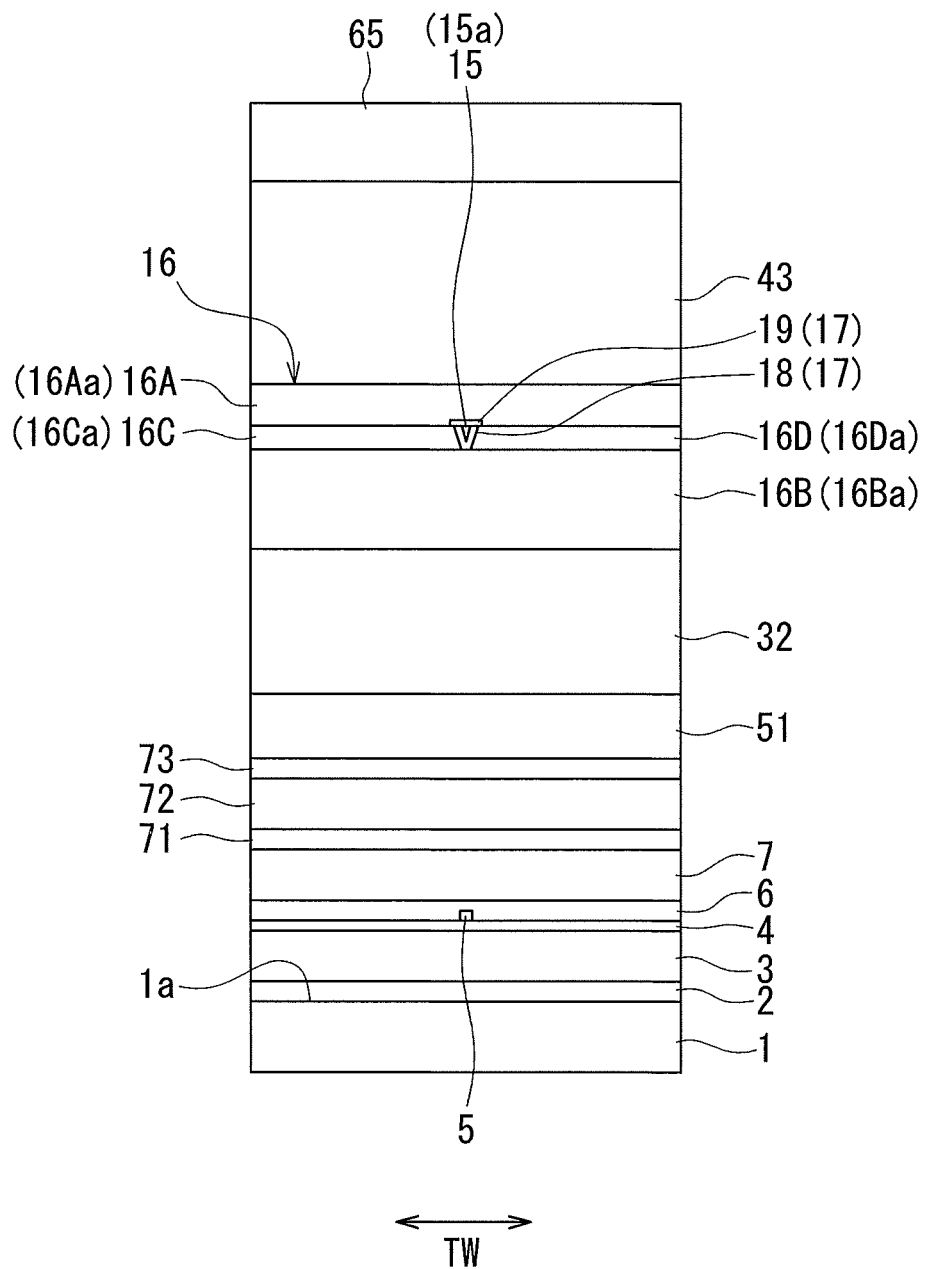
FIG. 3 is a front view showing the medium facing surface of the magnetic head according to the first embodiment of the invention.
Figure 4:
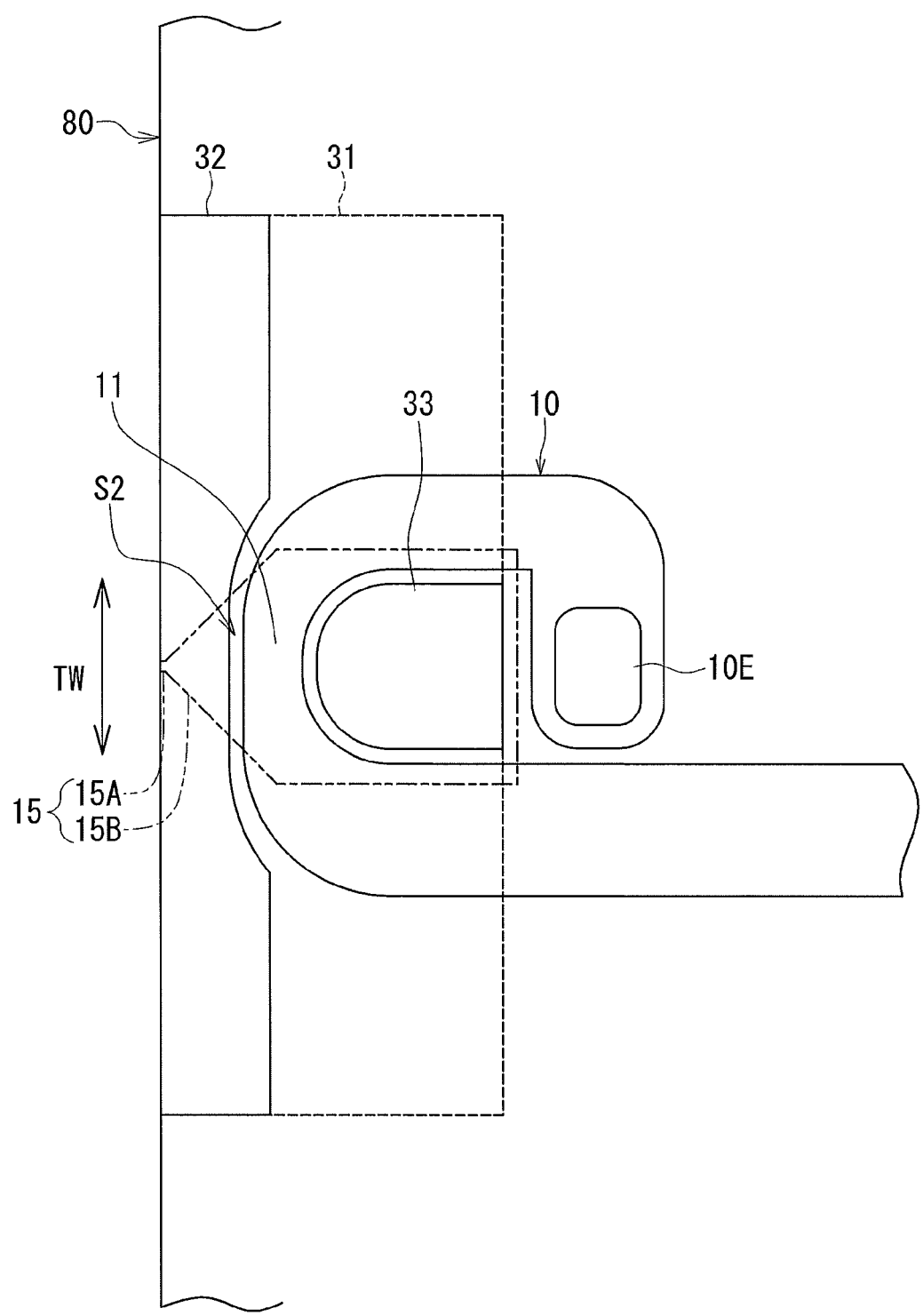
FIG. 4 is a plan view showing a second coil portion of the magnetic head according to the first embodiment of the invention.
Figure 5:
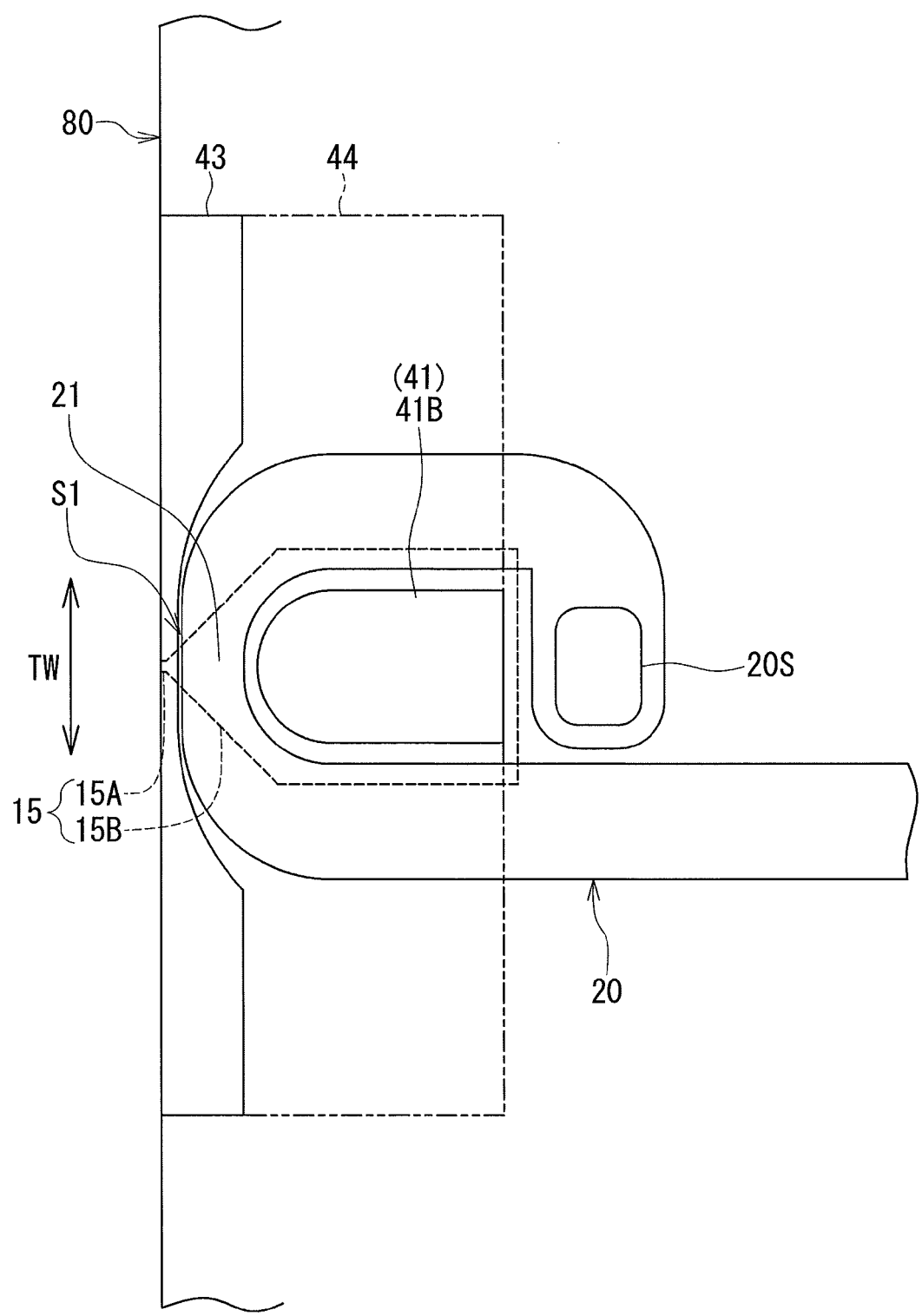
FIG. 5 is a plan view showing a first coil portion of the magnetic head according to the first embodiment of the invention.

Preferred embodiments of the present invention will now be described in detail with reference to the drawings. First, reference is made to FIG. 2 to FIG. 5 to describe the configuration of a magnetic head for perpendicular magnetic recording (hereinafter simply referred to as magnetic head) according to a first embodiment of the invention. FIG. 2 is a cross-sectional view of the magnetic head according to the present embodiment. The arrow labeled T in FIG. 2 indicates the direction of travel of a recording medium. FIG. 3 is a front view showing the medium facing surface of the magnetic head according to the present embodiment. FIG. 4 is a plan view showing a second coil portion of the magnetic head according to the present embodiment. FIG. 5 is a plan view showing a first coil portion of the magnetic head according to the present embodiment. In FIG. 3 to FIG. 5 the arrow labeled TW indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Here, the side of the positions closer to the leading end relative to a reference position will be referred to as the leading side, and the side of the positions closer to the trailing end relative to the reference position will be referred to as the trailing side. The leading side is the rear side in the direction T of travel of the recording medium 90 relative to the slider. The trailing side is the front side in the direction T of travel of the recording medium 90 relative to the slider.

As shown in FIG. 2, the magnetic head has the medium facing surface 80 mentioned above. As shown in FIGS. 2 and 3, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated at the write head unit 9. The nonmagnetic layers 71 and 73 are formed of alumina, for example.

The write head unit 9 includes a coil, a main pole 15, a write shield 16, and a gap section 17. The coil produces a magnetic field corresponding to data to be written on the recording medium 90. The coil includes a first coil portion 20 and a second coil portion 10. The first coil portion 20 and the second coil portion 10 are both formed of a conductive material such as copper. The first coil portion 20 and the second coil portion 10 are connected in series or in parallel. The main pole 15 has an end face 15a located in the medium facing surface 80. The main pole 15 passes a magnetic flux corresponding to the magnetic field produced by the coil, and produces a write magnetic field for writing data on the recording medium 90 by means of the perpendicular magnetic recording system. FIG. 2 shows a cross section that intersects the end face 15a of the main pole 15 and that is perpendicular to the medium facing surface 80 and to the top surface 1a of the substrate 1. Such a cross section will hereinafter be referred to as the main cross section.

The write shield 16 has an end face located in the medium facing surface 80. The end face of the write shield 16 includes first to fourth end face portions 16Aa, 16Ba, 16Ca, and 16Da. The first end face portion 16Aa is located on the trailing side, i.e., the front side in the direction T of travel of the recording medium 90, relative to the end face 15a of the main pole 15. The second end face portion 16Ba is located on the leading side, i.e., the rear side in the direction T of travel of the recording medium 90, relative to the end face 15a of the main pole 15. The third and fourth end face portions 16Ca and 16Da are located on opposite sides of the end face 15a of the main pole 15 in the track width direction TW. In the medium facing surface 80, the first to fourth end face portions 16Aa, 16Ba, 16Ca, and 16Da are arranged to surround the end face 15a of the main pole 15.

The write shield 16 is formed of a magnetic material. For example, CoFeN, CoNiFe, FeNi, or CoFe can be used as the material of the write shield 16.

The write head unit 9 further includes a first return path section 40 and a second return path section 30. The first return path section 40 is located on the trailing side, i.e., the front side in the direction T of travel of the recording medium 90, relative to the main pole 15, and connects the write shield 16 to a part of the main pole 15 located away from the medium facing surface 80, thereby magnetically coupling the write shield 16 and the main pole 15 to each other. The second return path section 30 is located on the leading side, i.e., the rear side in the direction T of travel of the recording medium 90, relative to the main pole 15, and connects the write shield 16 to a part of the main pole 15 located away from the medium facing surface 80, thereby magnetically coupling the write shield 16 and the main pole 15 to each other.

The second return path section 30 includes magnetic layers 31, 32, 33 and 34 each formed of a magnetic material. For example, CoFeN, CoNiFe, FeNi, or CoFe can be used as the material of each of the magnetic layers 31 to 34. The magnetic layer 31 lies on the nonmagnetic layer 73. The magnetic layers 32 and 33 both lie on the magnetic layer 31. The magnetic layer 32 is located near the medium facing surface 80. The magnetic layer 33 is located farther from the medium facing surface 80 than is the magnetic layer 32. The magnetic layer 31 has an end face that faces toward the medium facing surface 80 and that is located at a distance from the medium facing surface 80. The magnetic layer 32 has an end face located in the medium facing surface 80.

As shown in FIG. 4, the second coil portion 10 is wound around the magnetic layer 33. The write head unit 9 further includes: an insulating layer 51 formed of an insulating material, lying on the nonmagnetic layer 73 and surrounding the magnetic layer 31; an insulating film 52 formed of an insulating material and separating the second coil portion 10 from the magnetic layers 31 to 33; and a non-illustrated insulating layer formed of an insulating material and disposed around the second coil portion 10 and the magnetic layer 32. The top surfaces of the second coil portion 10, the magnetic layers 32 and 33, the insulating film 52 and the non-illustrated insulating layer are even with each other. The insulating layer 51, the insulating film 52 and the non-illustrated insulating layer are formed of alumina, for example.

As shown in FIG. 3, the write shield 16 includes a top shield 16A, a bottom shield 16B, and two side shields 16C and 16D. The top shield 16A is located on the trailing side, i.e., the front side in the direction T of travel of the recording medium 90, relative to the main pole 15. The bottom shield 16B is located on the leading side, i.e., the rear side in the direction T of travel of the recording medium 90, relative to the main pole 15. The two side shields 16C and 16D are located on opposite sides of the main pole 15 in the track width direction TW and magnetically couple the top shield 16A and the bottom shield 16B to each other.

As shown in FIG. 3, the top shield 16A has the first end face portion 16Aa. The bottom shield 16B has the second end face portion 16Ba. The side shield 16C has the third end face portion 16Ca. The side shield 16D has the fourth end face portion 16Da.

The bottom shield 16B lies on the magnetic layer 32. The magnetic layer 34 lies on the magnetic layer 33. The write head unit 9 further includes an insulating layer 53 formed of an insulating material, and a nonmagnetic layer 54 formed of a nonmagnetic material. The insulating layer 53 lies over the top surfaces of the second coil portion 10, the insulating film 52 and the non-illustrated insulating layer, and a part of the top surface of the magnetic layer 32. The nonmagnetic layer 54 lies on the insulating layer 53 and surrounds the bottom shield 16B and the magnetic layer 34. The insulating layer 53 and the nonmagnetic layer 54 are formed of alumina, for example.

The side shields 16C and 16D are disposed on the bottom shield 16B. The main pole 15 has: the end face 15a; a top surface 15T (see FIG. 2) located at the trailing-side end of the main pole 15, i.e., the front-side end of the main pole 15 in the direction T of travel of the recording medium 90; a bottom end 15L (see FIG. 2) opposite to the top surface 15T; and a first side portion and a second side portion (see FIG. 3) opposite to each other in the track width direction TW. The side shield 16C has a first sidewall opposed to the first side portion of the main pole 15. The side shield 16D has a second sidewall opposed to the second side portion of the main pole 15.

The gap section 17 is located between the main pole 15 and the write shield 16. The write head unit 9 further includes a first gap layer 18 and a second gap layer 19. The first gap layer 18 is formed of a nonmagnetic material and includes a portion constituting a part of the gap section 17. The second gap layer 19 is formed of a nonmagnetic material and includes a portion constituting another part of the gap section 17. The portion of the first gap layer 18 constituting the part of the gap section 17 is located between the main pole 15 and each of the bottom shield 16B and the side shields 16C and 16D. The portion of the second gap layer 19 constituting the other part of the gap section 17 is located between the main pole 15 and the top shield 16A.

The first gap layer 18 is disposed to extend along the first and second sidewalls of the side shields 16C and 16D, the top surface of the bottom shield 16B and the top surface of the nonmagnetic layer 54. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18.

A part of the main pole 15 lies above the top surfaces of the bottom shield 16B and the nonmagnetic layer 54. The first gap layer 18 is interposed between the part of the main pole 15 and the top surfaces of the bottom shield 16B and the nonmagnetic layer 54. As shown in FIG. 3, the first gap layer 18 is interposed also between the first side portion of the main pole 15 and the first sidewall of the side shield 16C, and between the second side portion of the main pole 15 and the second sidewall of the side shield 16D.

The bottom end 15L of the main pole 15 is in contact with the top surface of the magnetic layer 34 at a location away from the medium facing surface 80. The main pole 15 is formed of a magnetic metal material. The material of the main pole 15 may be, for example, NiFe, CoNiFe, or CoFe.

Figure 11:
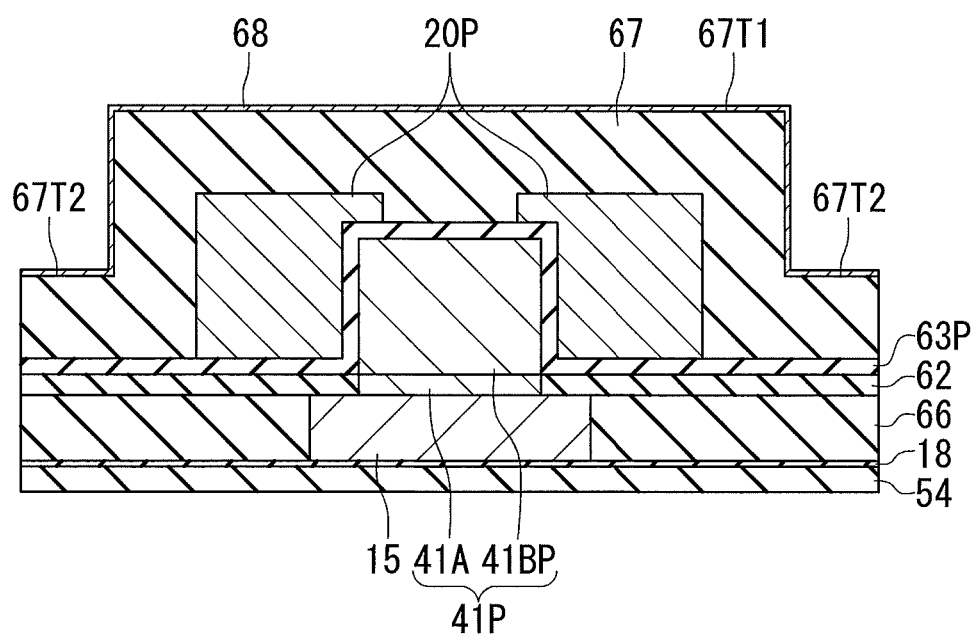
FIG. 11 is a cross-sectional view showing a step that follows the step shown in FIG. 10.

The write head unit 9 further includes a nonmagnetic layer 66 formed of a nonmagnetic material and disposed around the main pole 15 and the side shields 16C and 16D. The nonmagnetic layer 66 is shown in FIG. 11, which will be described later. The nonmagnetic layer 66 is formed of alumina, for example.

The write head unit 9 further includes a nonmagnetic metal layer 58 and an insulating layer 59. The nonmagnetic metal layer 58 is formed of a nonmagnetic metal material and lies on a first portion of the top surface 15T of the main pole 15, the first portion being located away from the medium facing surface 80. The insulating layer 59 is formed of an insulating material and lies on the top surface of the nonmagnetic metal layer 58. The nonmagnetic metal layer 58 is formed of Ru, NiCr, or NiCu, for example. The insulating layer 59 is formed of alumina, for example.

The second gap layer 19 is disposed to cover the main pole 15, the nonmagnetic metal layer 58 and the insulating layer 59. The material of the second gap layer 19 may be a nonmagnetic insulating material such as alumina, or a nonmagnetic conductive material such as Ru, NiCu, Ta, W, NiB, or NiP.

The top shield 16A lies on the side shields 16C and 16D and the second gap layer 19, and is in contact with the top surfaces of the side shields 16C and 16D and the second gap layer 19. In the medium facing surface 80, a part of the first end face portion 16Aa of the top shield 16A is spaced from the end face 15a of the main pole 15 by a predetermined distance created by the thickness of the second gap layer 19. The thickness of the second gap layer 19 preferably falls within the range of 5 to 60 nm, and may be 30 to 60 nm, for example. The end face 15a of the main pole 15 has a side in contact with the second gap layer 19. This side of the end face 15a defines the track width.

The first return path section 40 includes: a first portion 43 formed of a first magnetic material; a second portion 44 formed of a second magnetic material; a connection section 41 formed of a third magnetic material and having a columnar shape; and a first intermediate film 45. The third magnetic material may be one of CoFeN, CoNiFe, FeNi and CoFe, for example. The first and second magnetic materials and the material of the first intermediate film 45 will be described later.

The connection section 41 includes a first layer 41A and a second layer 41B. The first layer 41A lies on a second portion of the top surface 15T of the main pole 15, the second portion being located away from the medium facing surface 80. The second layer 41B lies on the first layer 41A. The second portion of the top surface 15T of the main pole 15 is located farther from the medium facing surface 80 than is the first portion of the top surface 15T of the main pole 15.

The write head unit 9 further includes nonmagnetic layers 61 and 62 each formed of a nonmagnetic material. The nonmagnetic layer 61 lies on the second gap layer 19. The nonmagnetic layer 61 has an end that is closest to the medium facing surface 80 and located at a distance from the medium facing surface 80. The nonmagnetic layer 62 lies on the nonmagnetic layer 61 and surrounds the top shield 16A and the first layer 41A. The top surfaces of the top shield 16A, the first layer 41A and the nonmagnetic layer 62 are even with each other. The nonmagnetic layer 61 is formed of alumina or $SiO_2$, for example. The nonmagnetic layer 62 is formed of alumina, for example.

As shown in FIG. 5, the first coil portion 20 is wound around the second layer 41B. The write head unit 9 further includes an insulating film 63 and an insulating film 64. The insulating film 63 is formed of an insulating material and separates at least part of the first coil portion 20 from the second layer 41B and the nonmagnetic layer 62. The insulating film 64 is formed of an insulating material and disposed to cover at least part of the first coil portion 20 and the insulating film 63. The insulating films 63 and 64 are formed of alumina, for example.

The first portion 43 lies on the top shield 16A and the nonmagnetic layer 62. The first portion 43 may include a part riding over the insulating film 64. The second portion 44 lies on the second layer 41B and the insulating film 64. The first intermediate film 45 is interposed between the first portion 43 and the second portion 44. In FIG. 2 the first intermediate film 45 is shown by a thick line. The write head unit 9 further includes a nonmagnetic layer 67 and a non-illustrated nonmagnetic layer each formed of a nonmagnetic material. The nonmagnetic layer 67 is disposed around the first coil portion 20. The nonmagnetic layer 67 is shown in FIG. 11 to be described later. The non-illustrated nonmagnetic layer lies on the nonmagnetic layer 67 and surrounds the first portion 43, the second portion 44 and the first intermediate film 45. The nonmagnetic layer 67 and the non-illustrated nonmagnetic layer are formed of alumina, for example.

As shown in FIG. 2 and FIG. 3, the magnetic head further includes a protective layer 65 formed of a nonmagnetic material and disposed to cover the write head unit 9. The protective layer 65 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the coil including the first and second coil portions 20 and 10, the main pole 15, the write shield 16, the gap section 17, the first and second return path sections 40 and 30, and the insulating film 63. The write shield 16 includes the top shield 16A, the bottom shield 16B and the two side shields 16C and 16D. The gap section 17 is constituted by a part of the first gap layer 18 and a part of the second gap layer 19. Since the first and second gap layers 18 and 19 are both formed of nonmagnetic material, the gap section 17 is formed of nonmagnetic material.

The first return path section 40 includes the first portion 43, the second portion 44, the connection section 41, and the first intermediate film 45. The first return path section 40 is located on the trailing side, i.e., the front side in the direction T of travel of the recording medium 90 relative to the main pole 15, and connects the write shield 16 to a part of the main pole 15 located away from the medium facing surface 80 so that a first space S1 is defined by the main pole 15, the gap section 17 (the gap layer 19), the write shield 16 and the first return path section 40. The first coil portion 20 passes through the first space S1.

The second return path section 30 includes the magnetic layers 31 to 34. The second return path section 30 is located on the leading side, i.e., the rear side in the direction T of travel of the recording medium 90 relative to the main pole 15, and connects the write shield 16 to a part of the main pole 15 located away from the medium facing surface 80 so that a second space S2 is defined by the main pole 15, the gap section 17 (the gap layer 18), the write shield 16 and the second return path section 30. The second coil portion 10 passes through the second space S2.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 also has the function of capturing a magnetic flux that is produced from the end face 15a of the main pole 15 and spreads in directions other than the direction perpendicular to the plane of the recording medium 90, and thereby preventing the magnetic flux from reaching the recording medium 90. Furthermore, the write shield 16 and the first and second return path sections 40 and 30 have the function of allowing a magnetic flux that has been produced from the end face 15a of the main pole 15 and has magnetized a part of the recording medium 90 to flow back.

Figure 1:
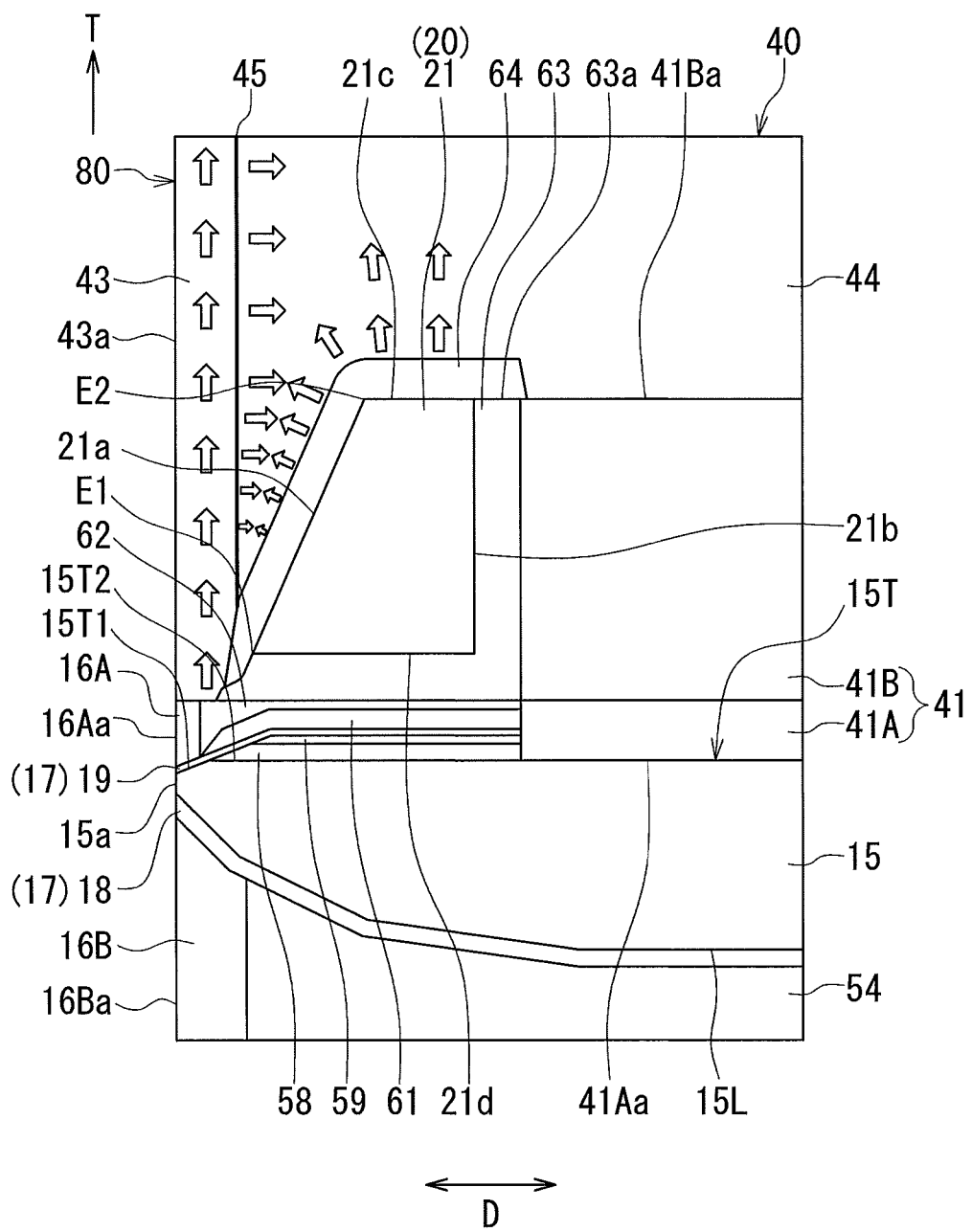
FIG. 1 is a cross-sectional view showing the main part of a magnetic head according to a first embodiment of the invention.

Reference is now made to FIG. 1, FIG. 4 and FIG. 5 to describe the configurations of the first and second coil portions 20 and 10. FIG. 1 is a cross-sectional view showing the main part of the magnetic head according to the present embodiment. FIG. 1 shows the main cross section. As shown in FIG. 4, the second coil portion 10 is wound approximately once around the magnetic layer 33. The second coil portion 10 includes a second coil element 11 extending to pass through the second space S2. Since the second coil portion 10 is a part of the coil, the coil can be said to include the second coil element 11. The second coil element 11 is a part of the winding of the coil. The second coil portion 10 has a coil connection 10E electrically connected to the first coil portion 20.

As shown in FIG. 5, the first coil portion 20 is wound approximately once around the second layer 41B of the connection section 41. The first coil portion 20 includes a first coil element 21 extending to pass through the first space SP 1. Since the first coil portion 20 is a part of the coil, the coil can be said to include the first coil element 21. The first coil element 21 is a part of the winding of the coil.

As shown in FIG. 1, the first coil element 21 has a front end face 21a facing toward the medium facing surface 80, a rear end face 21b opposite thereto, a top surface 21c, and a bottom surface 21d. The insulating film 63 extends to be in contact with the rear end face 21b and the bottom surface 21d of the first coil element 21, and is interposed between the second layer 41B of the connection section 41 and the first coil element 21 and between the main pole 15 and the first coil element 21. In the present embodiment, the insulating film 63 has a top surface 63a coplanar with the top surface 21c of the first coil element 21. The insulating film 64 extends to be in contact with the front end face 21a and the top surface 21c of the first coil element 21.

The front end face 21a of the first coil element 21 has a first end E1 closest to the main pole 15, and a second end E2 opposite to the first end E1. The front end face 21a is inclined with respect to the medium facing surface 80 and a direction perpendicular to the medium facing surface 80 such that the second end E2 is at a greater distance from the medium facing surface 80 than is the first end E1. In FIG. 1, the arrow labeled D indicates the direction perpendicular to the medium facing surface 80.

The first coil portion 20 has a coil connection 20S electrically connected to the coil connection 10E of the second coil portion 10. The coil connection 20S is electrically connected to the coil connection 10E via first to third connection layers of columnar shape (not illustrated) that penetrate a plurality of layers interposed between the first coil portion 20 and the second coil portion 10. The first to third connection layers are stacked in this order on the coil connection 10E. The coil connection 20S lies on the third connection layer. The first to third connection layers are each formed of a conductive material such as copper. In the example shown in FIGS. 4 and 5, the first coil portion 20 and the second coil portion 10 are connected in series.

The shape of the main pole 15 will now be described in detail with reference to FIG. 1 and FIG. 3 to FIG. 5. As shown in FIG. 4 and FIG. 5, the main pole 15 includes a track width defining portion 15A and a wide portion 15B. The track width defining portion 15A has the end face 15a and an end opposite to the end face 15a. The wide portion 15B is connected to the end of the track width defining portion 15A. The main pole 15 has the top surface 15T, the bottom end 15L, the first side portion and the second side portion. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 80. In the wide portion 15B, the width of the top surface 15T in the track width direction TW is, for example, equal to that in the track width defining portion 15A at the boundary between the track width defining portion 15A and the wide portion 15B, and gradually increases with increasing distance from the medium facing surface 80, then becoming constant. The length of the track width defining portion 15A in the direction D perpendicular to the medium facing surface 80 will be referred to as the neck height. The neck height falls within the range of 0 to 0.3 for example. A zero neck height means that the track width defining portion 15A is not provided and the wide portion 15B thus has the end face 15a.

As shown in FIG. 1, the top surface 15T includes an inclined portion 15T1 and a flat portion 15T2, the inclined portion 15T1 being located closer to the medium facing surface 80 than the flat portion 15T2. The inclined portion 15T1 has a first end located in the medium facing surface 80 and a second end opposite to the first end. The flat portion 15T2 is connected to the second end of the inclined portion 15T1. The inclined portion 15T1 is inclined with respect to the medium facing surface 80 and the direction D perpendicular to the medium facing surface 80 such that the second end is located on the front side in the direction T of travel of the recording medium 90 relative to the first end. The flat portion 15T2 extends substantially in the direction D perpendicular to the medium facing surface 80.

The bottom end 15L may include an inclined portion opposed to the top surface of the bottom shield 16B. The inclined portion of the bottom end 15L has a first end located in the medium facing surface 80 and a second end opposite to the first end. The inclined portion of the bottom end 15L may be an edge formed by two intersecting surfaces, or may be a surface connecting two surfaces. The inclined portion of the bottom end 15L is inclined with respect to the medium facing surface 80 and the direction D perpendicular to the medium facing surface 80 such that its second end is located on the rear side in the direction T of travel of the recording medium 90 relative to its first end. The bottom end 15L excluding the inclined portion is a surface connected to the second end of the inclined portion.

As shown in FIG. 3, the end face 15a of the main pole 15 has a first side in contact with the second gap layer 19, a second side connected to one end of the first side, and a third side connected to the other end of the first side. The first side defines the track width. The position of an end of a record bit to be recorded on the recording medium 90 is determined by the position of the first side. The width of the end face 15a of the main pole 15 in the track width direction TW decreases with increasing distance from the first side, that is, with decreasing distance to the top surface 1a of the substrate 1. Each of the second side and the third side forms an angle of, for example, 7° to 17°, or preferably 10° to 15°, with respect to a direction perpendicular to the top surface 1a of the substrate 1. The first side has a length in the range of 0.05 to 0.20 µm, for example.

The first return path section 40 will now be described in detail with reference to FIG. 1. The first return path section 40 includes the first portion 43, the second portion 44 and the first intermediate film 45. The first portion 43 has an end face 43a closer to the the medium facing surface 80. In the present embodiment, the end face 43a is located in the medium facing surface 80. The second portion 44 is located farther from the medium facing surface 80 than is the first portion 43.

In the present embodiment, the first portion 43 is located on the front side in the direction T of travel of the recording medium 90 relative to the top shield 16A. At least part of the first portion 43 is interposed between the medium facing surface 80 and the front end face 21a of the first coil element 21. At least part of the second portion 44 is interposed between the first portion 43 and the front end face 21a of the first coil element 21.

The first intermediate film 45 is interposed between the first portion 43 and the second portion 44. The thickness of the first intermediate film 45 in the direction D perpendicular to the medium facing surface 80 is smaller than the maximum thickness of the first portion 43 in the direction D perpendicular to the medium facing surface 80.

The first portion 43 is formed of the first magnetic material. The second portion is formed of the second magnetic material. Each of the first and second magnetic materials may be one of CoFeN, CoNiFe, FeNi and CoFe, for example. The first magnetic material and the second magnetic material may be the same or different from each other. In the latter case, the second magnetic material is preferably higher in saturation flux density than the first magnetic material. For example, the second magnetic material may be CoNiFe or CoFe having a saturation flux density of about 1.9 T or about 2.4 T, and the first magnetic material may be FeNi having a saturation flux density of about 1.6 T. Even when the first magnetic material and the second magnetic material are the same, the first portion 43 and the second portion 44 are distinguishable as different portions from each other because the first intermediate film 45 is present between the first portion 43 and the second portion 44.

In the present embodiment, the first intermediate film 45 is an oxide film containing an element constituting the first magnetic material, and oxygen. The thickness and composition of the first intermediate film 45 can be identified by observing cross sections of the first intermediate film 45 with a transmission electron microscope (TEM) and analyzing the composition of the first intermediate film 45 by electron energy loss spectroscopy (EELS).

The first return path section 40 further includes the connection section 41. The connection section 41 includes the first layer 41A and the second layer 41B, and connects the second portion 44 to a part of the main pole 15 located away from the medium facing surface 80. The connection section 41 has a bottom surface 41Aa in contact with the main pole 15, and a top surface 41Ba opposite to the bottom surface 41Aa. The first coil element 21, the insulating film 63 and the connection section 41 have their respective top surfaces coplanar with each other. More specifically, the top surface 21c of the first coil element 21, the top surface 63a of the insulating film 63 and the top surface 41Ba of the connection section 41 are coplanar with each other.

Now, functions and effects specific to the magnetic head according to the present embodiment will be described. First, crystal growth directions of the first and second portions 43 and 44 of the first return path section 40 will be described with reference to FIG. 1. As will be detailed later, the first and second portions 43 and 44 are formed by plating. In FIG. 1, the hollow arrows indicate the crystal growth directions of the first and second portions 43 and 44 formed by plating. As shown in FIG. 1, most part of the first portion 43 has a crystal growth direction perpendicular to the top surface 1a of the substrate 1. The second portion 44 includes a portion having a crystal growth direction perpendicular to the front end face 21a of the first coil element 21 and portions having other crystal growth directions.

In the present embodiment, at least part of the first portion 43 is interposed between the medium facing surface 80 and the front end face 21a of the first coil element 21, while at least part of the second portion 44 is interposed between the first portion 43 and the front end face 21a of the first coil element 21. A region that lies below the first portion 43 and coincides with the first portion 43 when viewed in the direction perpendicular to the top surface 1a (see FIG. 2 and FIG. 3) of the substrate 1 does not include any region in which the first coil element 21 is present. Most part of the underlayer for the first portion 43 is constituted by the top shield 16A and the nonmagnetic layer 62 whose top surfaces are even with each other. Thus, the first portion 43 can be formed by plating such that most part of the first portion 43 has a uniform crystal growth direction which is perpendicular to the top surface 1a of the substrate 1 and no part of the first portion 43 has a crystal growth direction perpendicular to the front end face 21a of the first coil element 21. This allows the first portion 43 to have few grain boundaries or defects. As a result, magnetization rotation and domain wall displacement proceed smoothly in the first portion 43, so that the occurrence of leakage magnetic field from the end face 43a of the first portion 43 toward the outside of the medium facing surface 80 is prevented.

On the other hand, a region that lies below the second portion 44 and coincides with the second portion 44 when viewed in the direction perpendicular to the top surface 1a of the substrate 1 includes a region in which the first coil element 21 is present and a region in which the first coil element 21 is absent. Thus, if the second portion 44 is formed by plating, the resulting second portion 44 includes a portion having a crystal growth direction perpendicular to the front end face 21a of the first coil element 21 and portions having other crystal growth directions. However, since the first portion 43 is interposed between the medium facing surface 80 and the second portion 44, the second portion 44 is prevented from becoming a cause of leakage magnetic field. The present embodiment thus makes it possible to prevent the occurrence of unwanted erasure.

The foregoing descriptions also apply for the case where the front end face 21a of the first coil element 21 is parallel to the medium facing surface 80.

Figure 6:
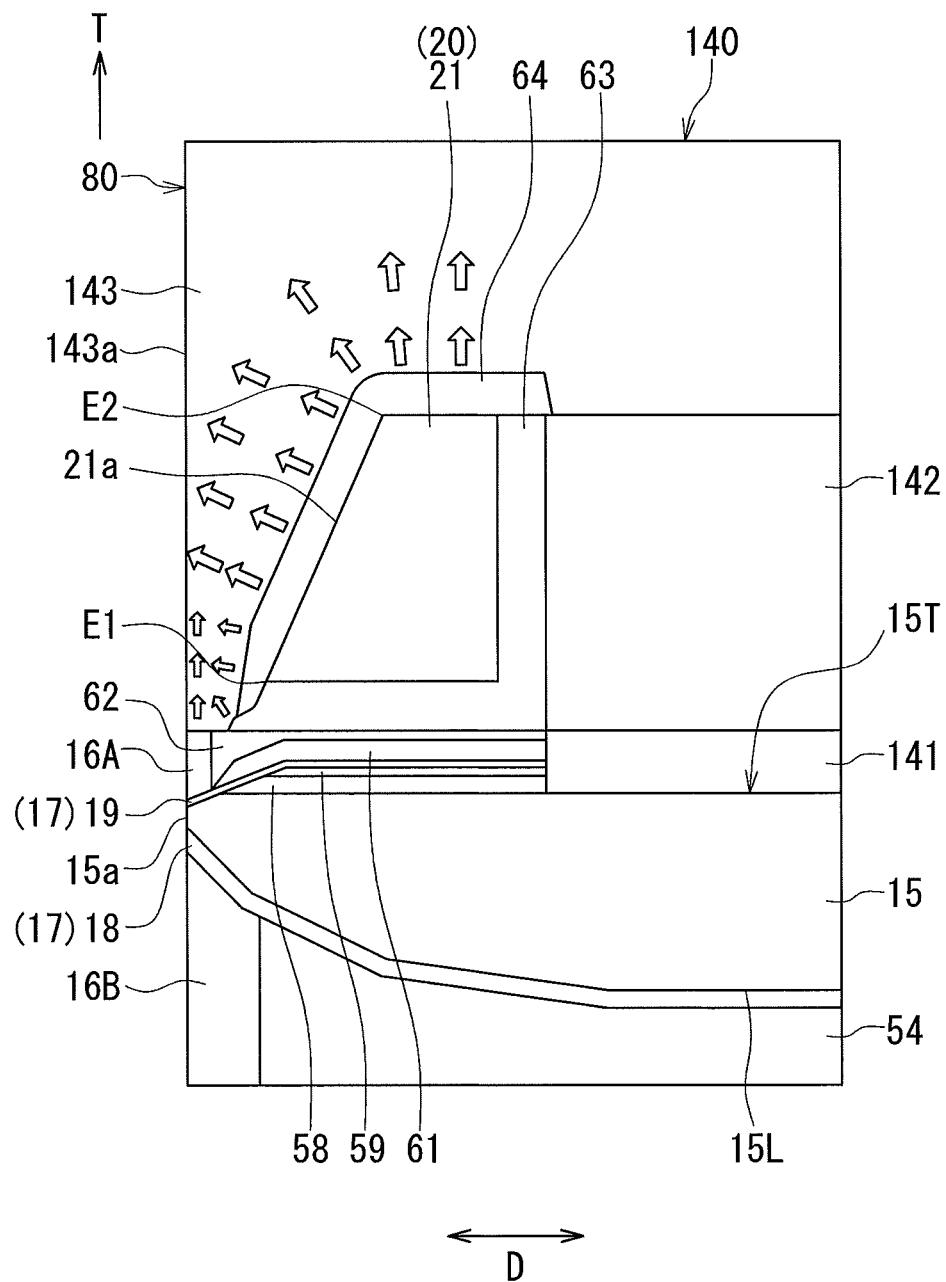
FIG. 6 is a cross-sectional view showing the main part of a magnetic head of a comparative example.

The effects of the present embodiment will be described in more detail in comparison with a magnetic head of a comparative example. FIG. 6 is a cross-sectional view showing the main part of the magnetic head of the comparative example. The magnetic head of the comparative example includes a return path section 140 of a comparative example in place of the first return path section 40 of the present embodiment. The return path section 140 of the comparative example includes magnetic layers 141, 142 and 143 each formed of a magnetic material. The magnetic layers 141 and 142 are shaped and located in the same manner as the first and second layers 41A and 41B of the connection section 41 of the present embodiment. The magnetic layer 143 lies on the top shield 16A, the magnetic layer 142 and the insulating film 64, and has an end face 143a located in the medium facing surface 80. The magnetic layer 143 is formed by plating. FIG. 6, the hollow arrows indicate the crystal growth directions of the magnetic layer 143 formed by plating.

A region that lies below the magnetic layer 143 and coincides with the magnetic layer 143 when viewed in the direction perpendicular to the top surface 1a of the substrate 1 includes a region in which the top shield 16A is present, a region in which the first coil element 21 is present, and a region in which the magnetic layer 142 is present. Thus, if the magnetic layer 143 is formed by plating, the resulting magnetic layer 143 includes a plurality of portions having different crystal growth directions as shown in FIG. 6, like the second portion 44, and thus has a greater number of grain boundaries and defects. In the magnetic layer 143, magnetization rotation and domain wall displacement cannot smoothly proceed, and leakage magnetic field is thus likely to occur from the end face 143a of the magnetic layer 143 toward the outside of the medium facing surface 80. This results in the problem of the occurrence of unwanted erasure.

In contrast, according to the present embodiment, since the first return path section 40 includes the first and second portions 43 and 44, it is possible to prevent the occurrence of unwanted erasure as previously.

The other effects of the present embodiment will now be described. As mentioned previously, the second magnetic material used to form the second portion 44 is preferably higher in saturation flux density than the first magnetic material used to form the first portion 43. If the second magnetic material is higher in saturation flux density than the first magnetic material, it is possible to make the rise time of the write current flowing through the coil shorter than in the case where the second magnetic material has a saturation flux density lower than or equal to that of the first magnetic material. Further, since magnetic flux becomes less likely to be saturated in the second portion 44, it is possible for the second portion 44 to be small in thickness. This allows a reduction in length of a magnetic path that is formed inside the first return path section 40 and passes through the vicinity of the top surface of the second portion 44. This also serves to shorten the rise time of the write current flowing through the coil.

A manufacturing method for the magnetic head according to the present embodiment will now be described. As shown in FIG. 2 and FIG. 3, the manufacturing method for the magnetic head according to the present embodiment starts with forming the insulating layer 2, the first read shield layer 3 and the first read shield gap film 4 in this order into a stack on the substrate 1. Then, the MR element 5 and leads (not illustrated) connected to the MR element 5 are formed on the first read shield gap film 4. The MR element 5 and the leads are then covered with the second read shield gap film 6. Next, the second read shield layer 7, the nonmagnetic layer 71, the middle shield layer 72 and the nonmagnetic layer 73 are formed in this order into a stack on the second read shield gap film 6.

Next, the magnetic layer 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the magnetic layer 31 is exposed. The magnetic layers 32 and 33 are then formed on the magnetic layer 31 by frame plating, for example. The insulating film 52 is then formed over the entire top surface of the stack. The second coil portion 10 is then formed by frame plating, for example. Next, the non-illustrated insulating layer is formed over the entire top surface of the stack. The insulating film 52 and the non-illustrated insulating layer are then polished by, for example, CMP, until the second coil portion 10 and the magnetic layers 32 and 33 are exposed.

Then, the insulating layer 53 is formed over the entire top surface of the stack. The insulating layer 53 is then selectively etched to form therein a first opening for exposing the top surface of the magnetic layer 32, a second opening for exposing the top surface of the magnetic layer 33, and a third opening for exposing the coil connection 10E (see FIG. 4) of the second coil portion 10. Then, an initial bottom shield, which will later become the bottom shield 16B, is formed on the magnetic layer 32 at the location of the first opening, the magnetic layer 34 is formed on the magnetic layer 33 at the location of the second opening, and the first connection layer (not illustrated) is formed on the coil connection 10E at the location of the third opening, by frame plating, for example. Next, the nonmagnetic layer 54 is formed over the entire top surface of the stack. The nonmagnetic layer 54 is then polished by, for example, CMP, until the initial bottom shield, the magnetic layer 34 and the first connection layer are exposed.

Next, the initial bottom shield and the nonmagnetic layer 54 are taper-etched in part by, for example, ion beam etching (hereinafter referred to as IBE) so that the top surface of the initial bottom shield is provided with a portion to be opposed to the inclined portion of the bottom end 15L of the main pole 15 to be formed later. This makes the initial bottom shield into the bottom shield 16B. This etching also etches the magnetic layer 34 and the first connection layer in part.

Next, the side shields 16C and 16D are formed on the bottom shield 16B by frame plating, for example. The first gap layer 18 is then formed to cover the bottom shield 16B and the side shields 16C and 16D. Where alumina is selected as the material of the first gap layer 18, the first gap layer 18 is formed by atomic layer deposition, for example. Where Ru is selected as the material of the first gap layer 18, the first gap layer 18 is formed by chemical vapor deposition, for example. Next, the first gap layer 18 is selectively etched to form therein an opening for exposing the top surface of the magnetic layer 34 and an opening for exposing the top surface of the first connection layer.

Next, a magnetic layer that will later become the main pole 15, and the second connection layer (not illustrated) are formed by frame plating, for example. The magnetic layer and the second connection layer are formed such that their top surfaces are higher in level than portions of the first gap layer 18 lying on the side shields 16C and 16D. Next, the nonmagnetic layer 66 is formed over the entire top surface of the stack. The magnetic layer, the second connection layer, the first gap layer 18 and the nonmagnetic layer 66 are then polished by, for example, CMP, until the side shields 16C and 16D are exposed.

Next, the nonmagnetic metal layer 58 and the insulating layer 59 are formed on the aforementioned magnetic layer and the side shields 16C and 16D. The magnetic layer, the side shields 16C and 16D and the nonmagnetic layer 66 are then etched in part by, for example, IBE using the nonmagnetic metal layer 58 and the insulating layer 59 so that the magnetic layer is provided with the inclined portion 15T1. A portion of the top surface of the etched magnetic layer that is covered with the nonmagnetic metal layer 58 and the insulating layer 59 makes the flat portion 15T2. As a result, the magnetic layer becomes the main pole 15. Then, the second gap layer 19 is formed over the entire top surface of the stack by sputtering or chemical vapor deposition, for example. The nonmagnetic layer 61 is then formed on the second gap layer 19. The nonmagnetic layer 61 may be formed by a lift-off process, or by first forming a nonmagnetic film on the second gap layer 19 and then etching a part of the nonmagnetic film.

Reference is now made to FIGS. 7 to 18 to describe a series of steps to be performed after the foregoing step up to the formation of the second portion 44. FIGS. 7 to 18 each illustrate a stack of layers formed in the process of manufacturing the magnetic head. FIGS. 7 to 10 and FIGS. 12 to 18 show a cross section perpendicular to the medium facing surface 80 and to the top surface 1a of the substrate 1, particularly the main cross section. In FIGS. 7 to 10 and FIGS. 12 to 18, the symbol "ABS" indicates the location at which the medium facing surface 80 is to be formed. FIG. 11 shows a cross section parallel to the medium facing surface 80. FIGS. 7 to 18 omit the illustration of parts located below the bottom shield 16B and the nonmagnetic layer 54.

Figure 7:
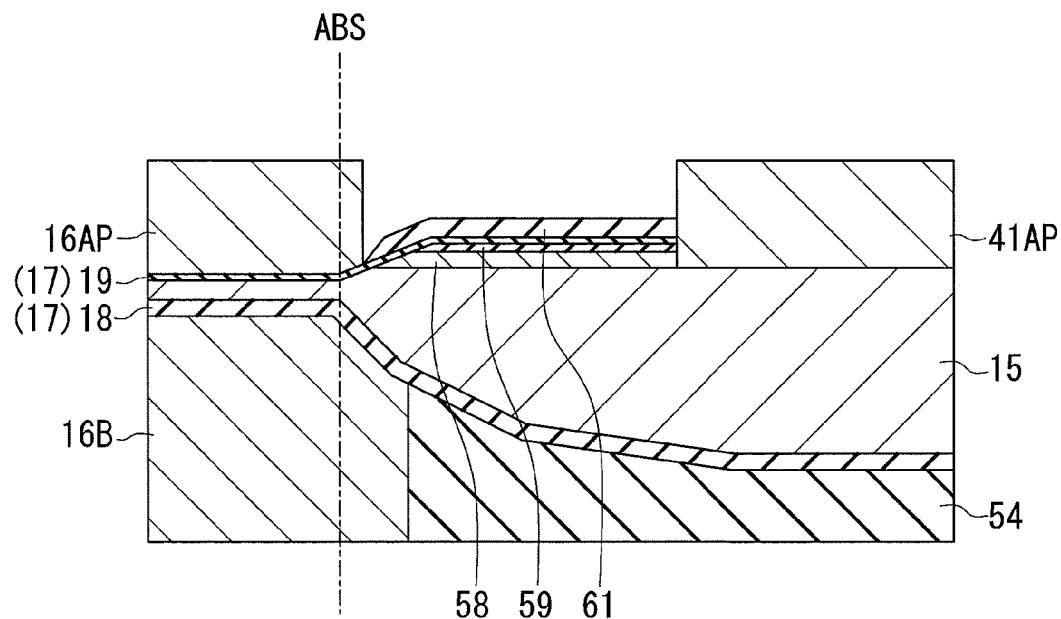
FIG. 7 is a cross-sectional view showing a step of a manufacturing method for the magnetic head according to the first embodiment of the invention.

In the step shown in FIG. 7, first, the second gap layer 19 and the nonmagnetic layer 61 are selectively etched so that the second portion of the top surface 15T of the main pole 15 and portions of the top surfaces of the side shields 16C and 16D are exposed, and the second gap layer 19 is selectively etched so that the top surface of the second connection layer is exposed. Next, an initial top shield 16AP is formed on the side shields 16C and 16D and the second gap layer 19, an initial first layer 41AP is formed on the main pole 15, and the third connection layer (not illustrated) is formed on the second connection layer, by frame plating, for example. The initial top shield 16AP will later become the top shield 16A. The initial first layer 41AP will later become the first layer 41A of the connection section 41. The initial top shield 16AP, the initial first layer 41AP and the third connection layer are formed such that their top surfaces are higher in level than the top surface of the nonmagnetic layer 61.

Figure 8:
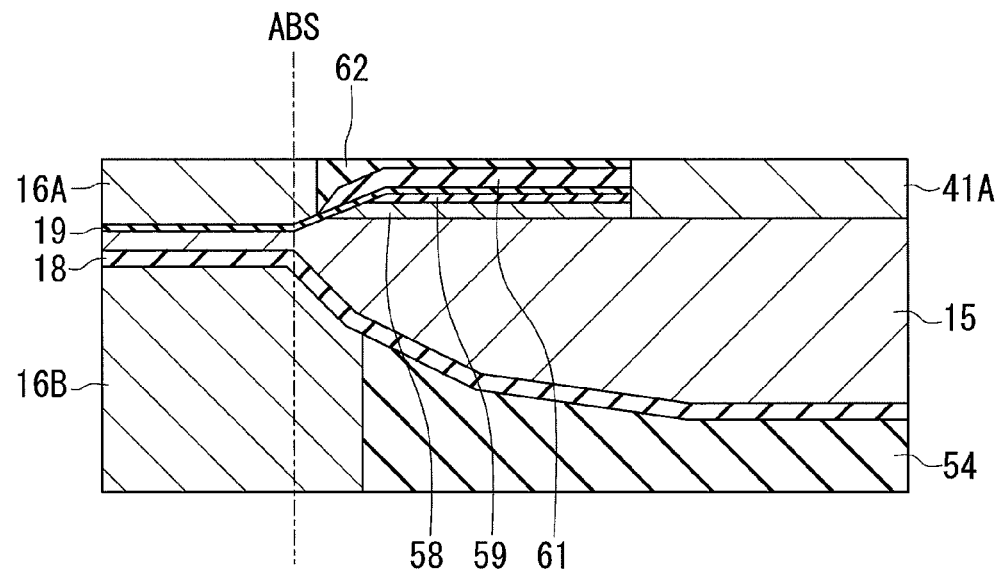
FIG. 8 is a cross-sectional view showing a step that follows the step shown in FIG. 7.

FIG. 8 shows the next step. In this step, first, the nonmagnetic layer 62 is formed over the entire top surface of the stack. The initial top shield 16AP, the initial first layer 41AP, the third connection layer and the nonmagnetic layer 62 are then polished by, for example, CMP, until the level of the top surface of the initial top shield 16AP reaches the level of the top surface of the top shield 16A. This makes the initial top shield 16AP and the initial first layer 41AP into the top shield 16A and the first layer 41A, respectively.

Figure 9:
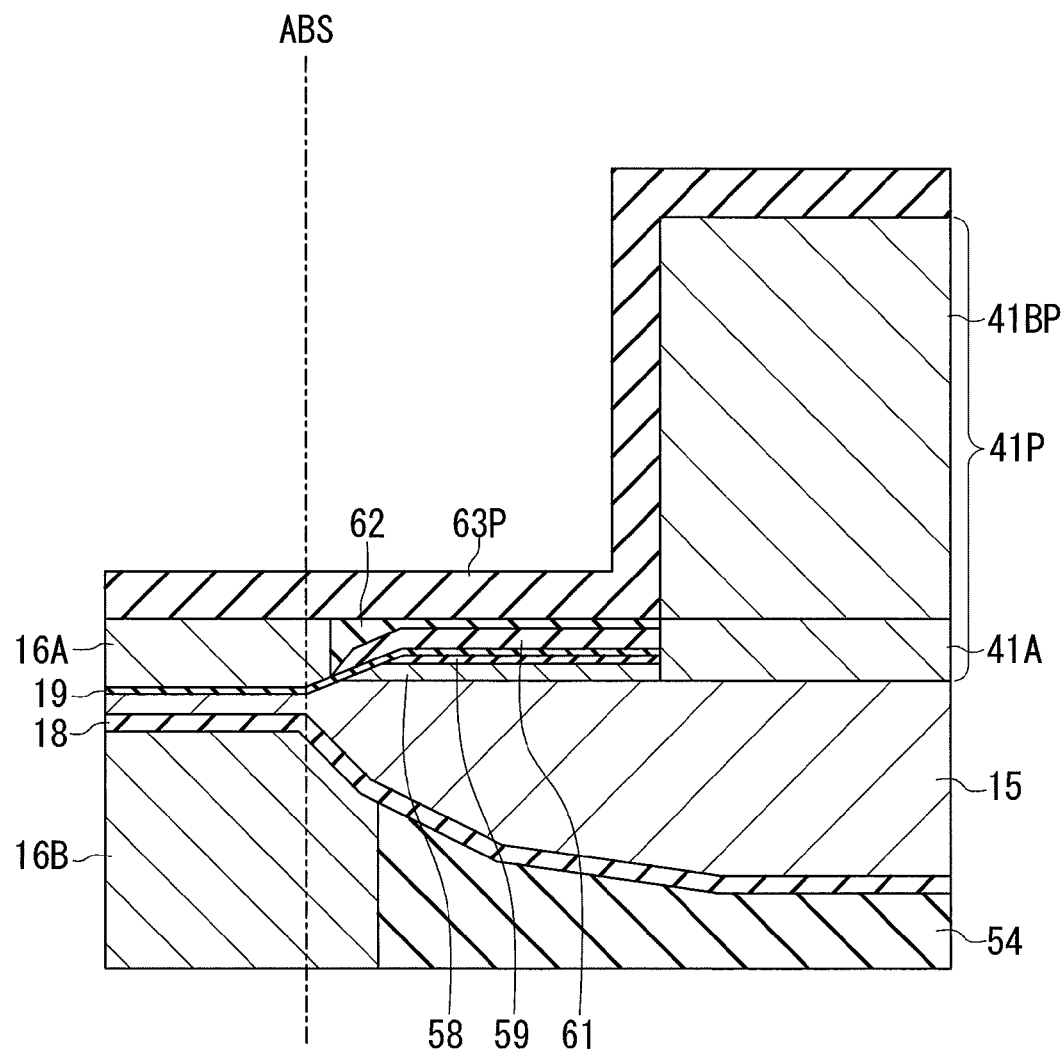
FIG. 9 is a cross-sectional view showing a step that follows the step shown in FIG. 8.

FIG. 9 shows the next step. In this step, first, an initial second layer 41BP, which will later become the second layer 41B of the connection section 41, is formed on the first layer 41A by frame plating, for example. The initial second layer 41BP is formed such that its top surface is higher in level than the top surface 21c (see FIG. 1) of the first coil element 21 to be formed later. The first layer 41A and the initial second layer 41BP constitute an initial connection section 41P which will later become the connection section 41. Next, an initial insulating film 63, which will later become the insulating film 63, is formed over the entire top surface of the stack by, for example, atomic layer deposition, to cover the top shield 16A and the initial connection section 41P. The initial insulating film 63P is then selectively etched to form therein an opening for exposing the top surface of the third connection layer.

Figure 10:
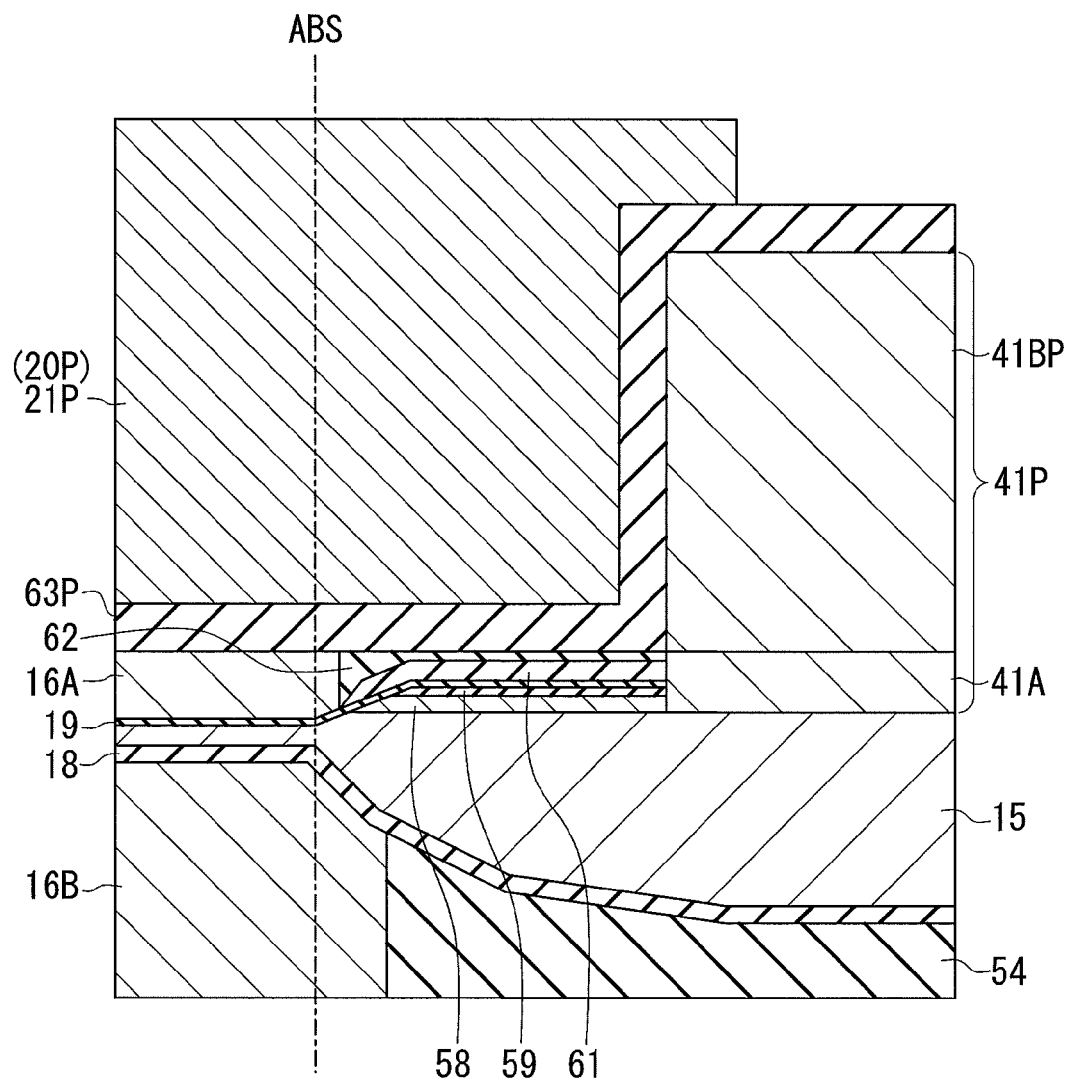
FIG. 10 is a cross-sectional view showing a step that follows the step shown in FIG. 9.

FIG. 10 shows the next step. In this step, an initial coil portion 20P, which will later become the first coil portion 20, is formed by frame plating, for example. The initial coil portion 20P includes an initial coil element 21P lying on the initial insulating film 63P. The initial coil element 21P is to later become the first coil element 21. The initial coil element 21P is formed such that a part thereof rides over the initial connection section 41P.

FIG. 11 shows the next step. In this step, first, the nonmagnetic layer 67 is formed over the entire top surface of the stack. The nonmagnetic layer 67 has a top surface including a projecting portion 67T1 and a peripheral portion 67T2. The projecting portion 67T1 lies above the initial coil portion 20P and the initial connection section 41P. The peripheral portion 67T2 lies on the periphery of the projecting portion 67T1 and is lower in level than the projecting portion 67T1. A polishing stopper layer 68 of a nonmagnetic metal material is then formed on the nonmagnetic layer 67 by sputtering, for example. The level of the top surface of a part of the polishing stopper layer 68 that lies above the peripheral portion 67T2 of the top surface of the nonmagnetic layer 67 defines the level of the top surface 21c of the first coil element 21 to be formed later. The material of the polishing stopper layer 68 may be Ru, for example.

Figure 12:
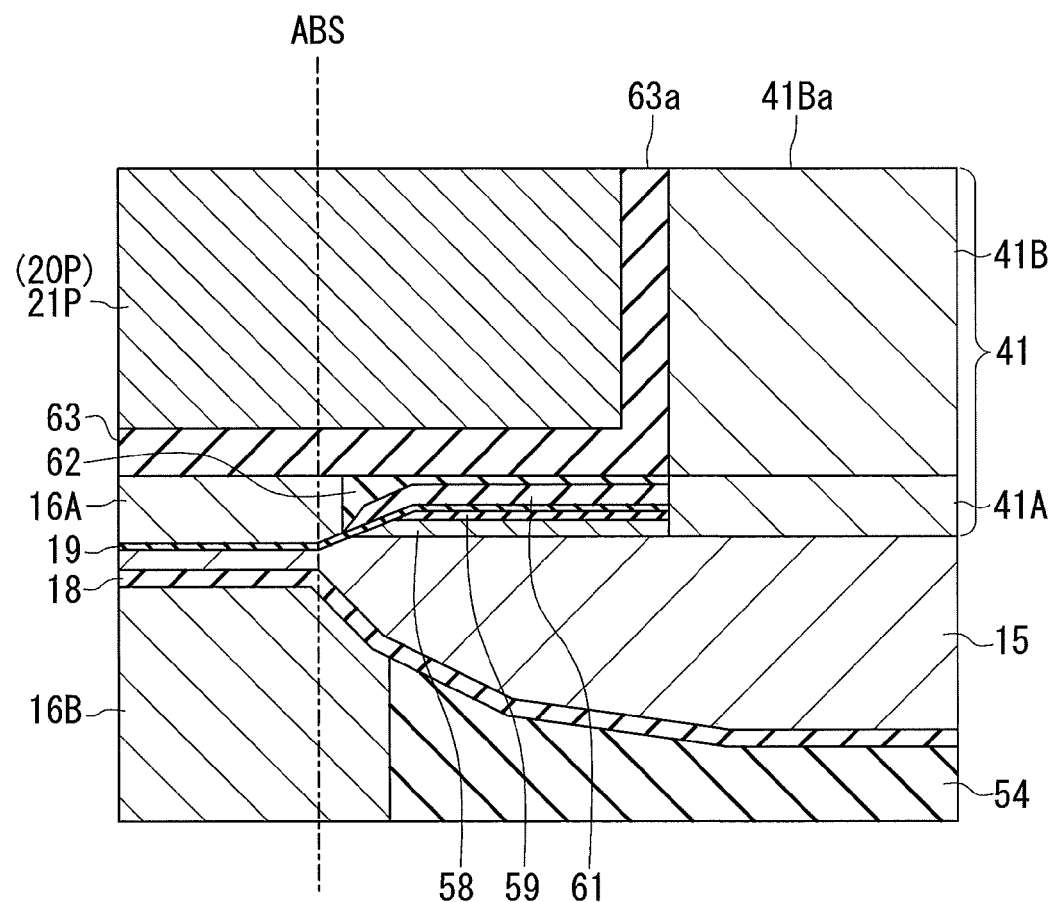
FIG. 12 is a cross-sectional view showing a step that follows the step shown in FIG. 11.

FIG. 12 shows the next step. In this step, the initial coil element 21P, the initial insulating film 63P and the initial connection section 41P are polished so that the initial insulating film 63P becomes the insulating film 63, the initial connection section 41P becomes the connection section 41 and the top surfaces of the initial coil element 21P, the insulating film 63 and the connection section 41 become even with each other. This step will hereinafter be referred to as the polishing step. More specifically, the polishing step polishes the initial coil portion 20P, the initial second layer 41BP of the initial connection section 41P, the nonmagnetic layer 67 and the polishing stopper layer 68 by, for example, CMP, until the part of the polishing stopper layer 68 that lies above the peripheral portion 67T2 of the top surface of the nonmagnetic layer 67 is exposed. In the polishing step, the part of the polishing stopper layer 68 that lies above the peripheral portion 67T2 of the top surface of the nonmagnetic layer 67 functions as a polishing stopper for stopping the polishing. The top surface of the initial coil element 21P after being etched includes a portion to become the top surface 21c (see FIG. 1) of the first coil element 21. The top surface of the initial coil element 21P after being etched is coplanar with the top surface 63a of the insulating film 63 and the top surface 41Ba of the connection section 41.

Figure 13:
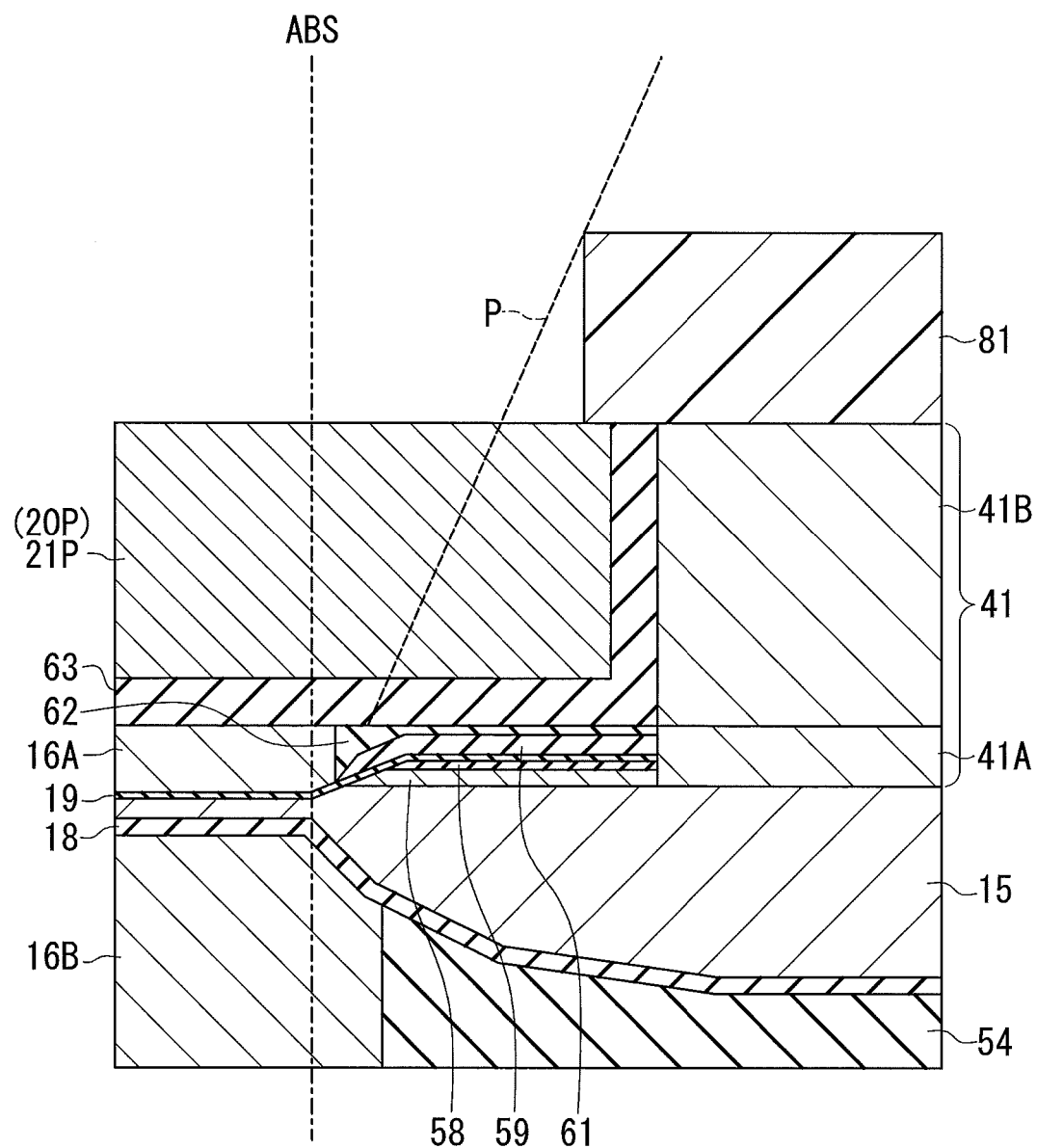
FIG. 13 is a cross-sectional view showing a step that follows the step shown in FIG. 12.

FIG. 13 shows the next step. In this step, a photoresist mask 81 is formed on the top surface of the stack. The photoresist mask 81 is formed by patterning a photoresist layer. Other photoresist masks to be used in later steps will be formed in the same manner as the photoresist mask 81. In FIG. 13, the symbol P represents an imaginary plane including the front end face 21a to be formed in the next step, which is etching using the photoresist mask 81.

Figure 14:
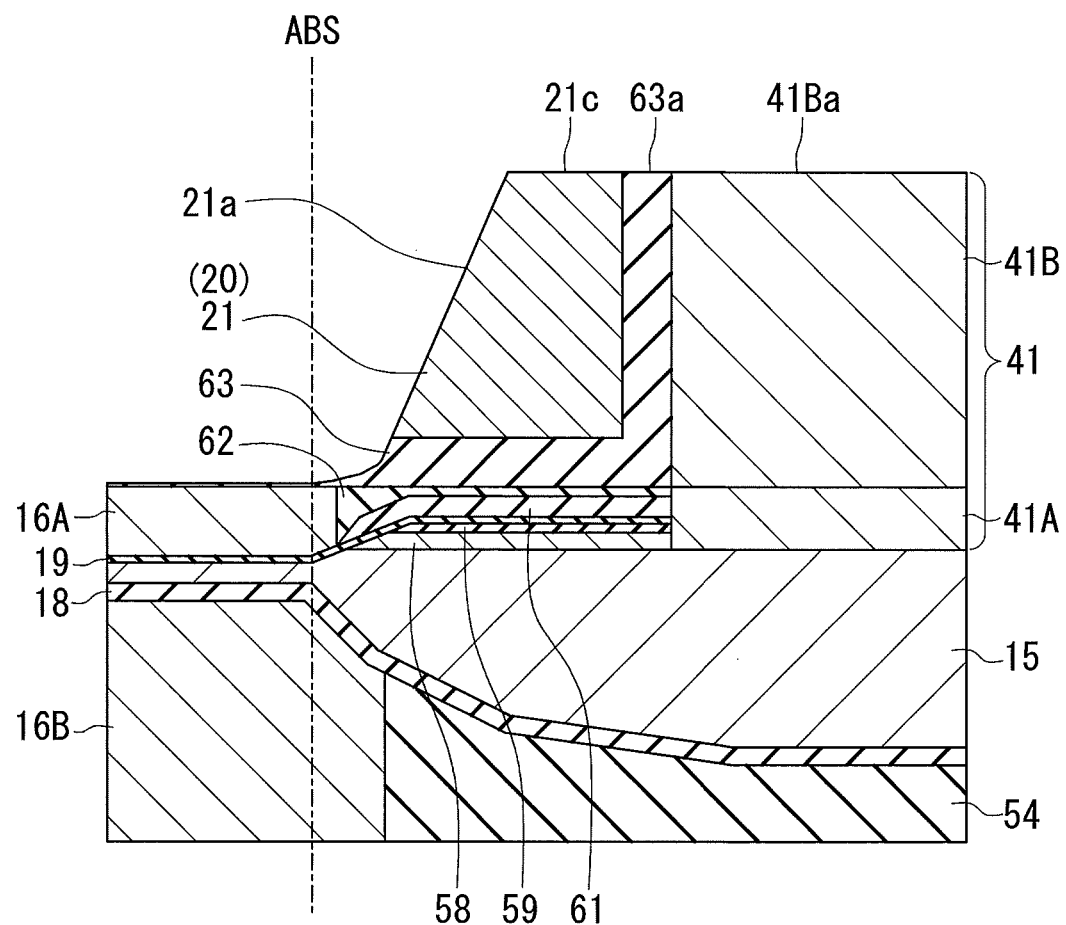
FIG. 14 is a cross-sectional view showing a step that follows the step shown in FIG. 13.

FIG. 14 shows the next step. In this step, first, a part of each of the initial coil element 21P, the insulating film 63 and the nonmagnetic layer 67 is etched by, for example, IBE, using the photoresist mask 81 as an etching mask. This step will hereinafter be referred to as the etching step. The direction of travel of the ion beams in IBE is inclined with respect to the direction perpendicular to the top surface 1a (see FIG. 2 and FIG. 3) of the substrate 1. This etching step provides the initial coil element 21P with the front end face 21a of the first coil element 21. This makes the initial coil element 21P into the first coil element 21, thereby making the initial coil portion 20P into the first coil portion 20. A part of the top surface of the initial coil element 21P that remains after the etching makes the top surface 21c. The etching step etches the part of the insulating film 63 so that the insulating film 63 partly remains on the top shield 16A. The photoresist mask 81 is then removed.

Figure 15:
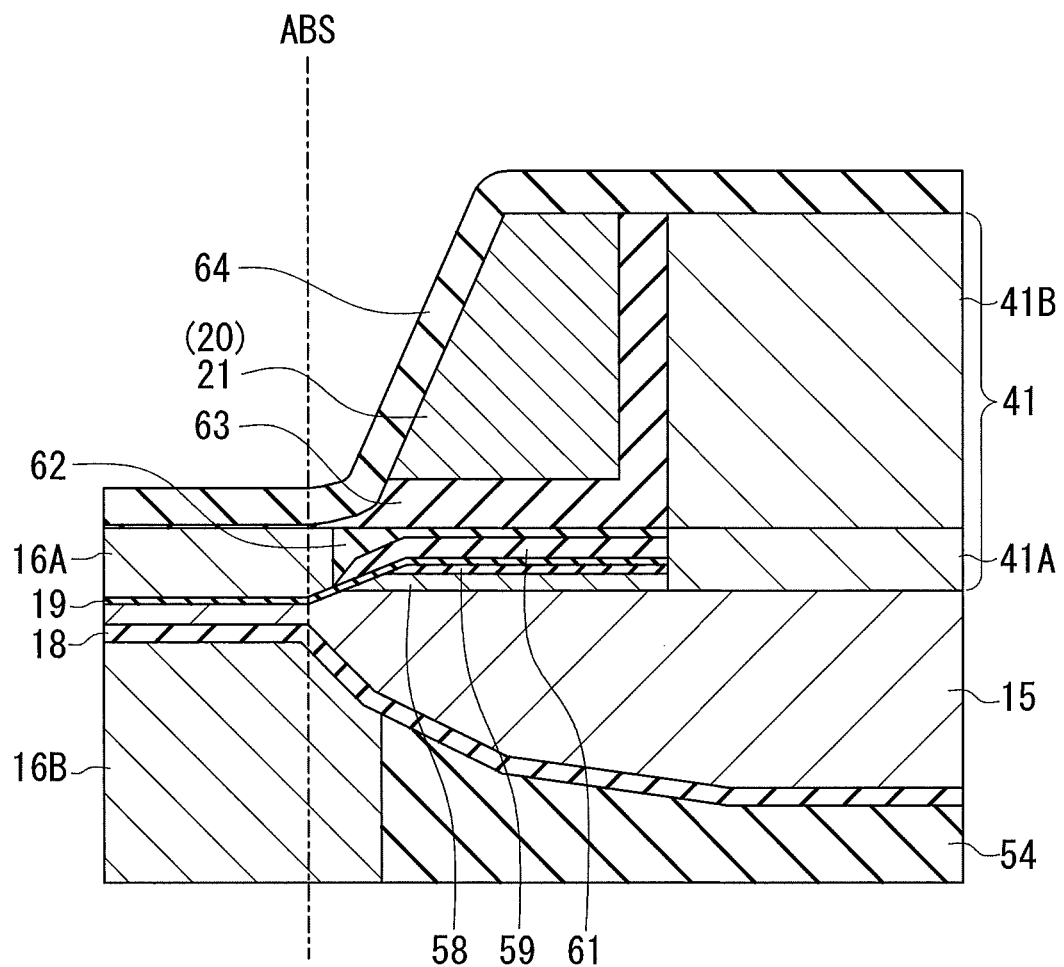
FIG. 15 is a cross-sectional view showing a step that follows the step shown in FIG. 14.

FIG. 15 shows the next step. In this step, the insulating film 64 is formed over the entire top surface of the stack by atomic layer deposition, for example. The insulating film 64 is formed to cover the front end face 21a of the first coil element 21.

Figure 16:
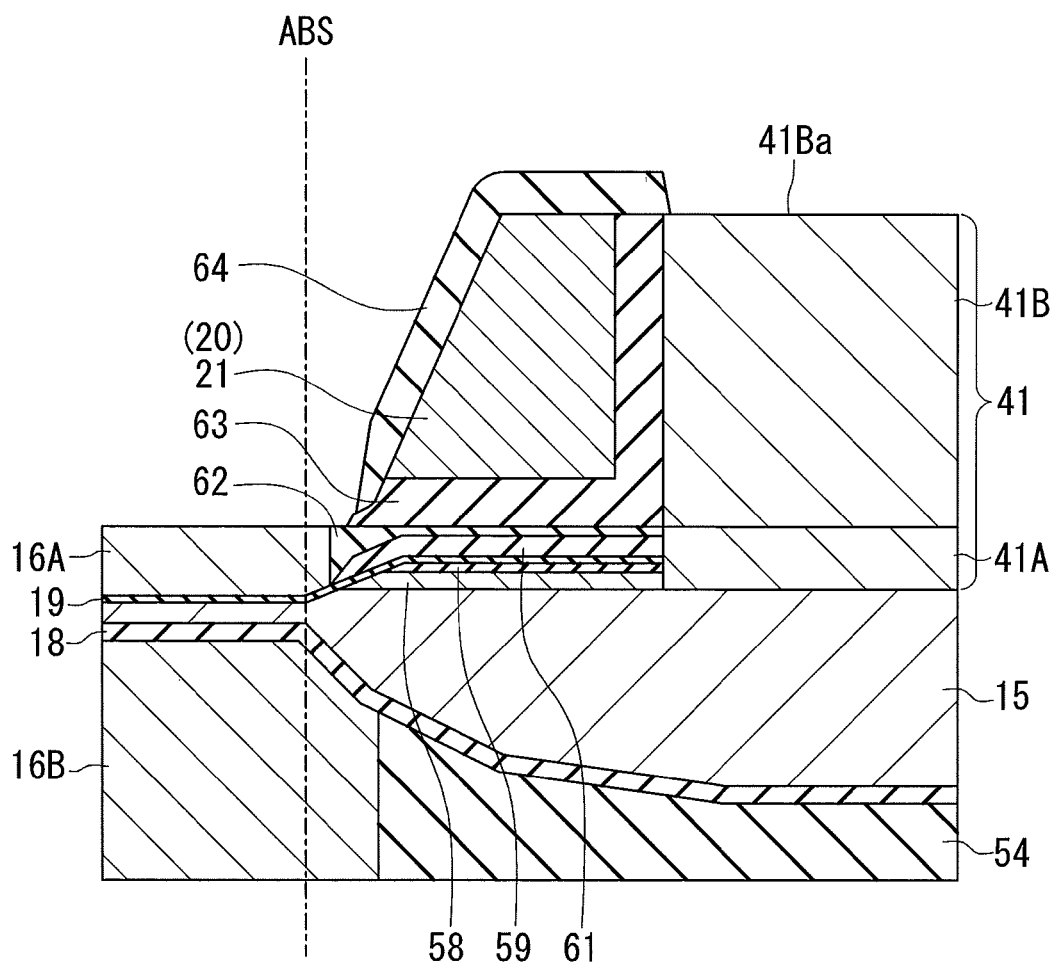
FIG. 16 is a cross-sectional view showing a step that follows the step shown in FIG. 15.

FIG. 16 shows the next step. In this step, first, a photoresist mask (not illustrated) is formed on the top surface of the stack. The photoresist mask does not cover a part of the top surface of the stack located above the top surface of the top shield 16A and a part of the top surface of the stack located above the top surface 41Ba of the connection section 41. Then, using the photoresist mask as an etching mask, IBE, for example, is performed to selectively etch the insulating films 63 and 64 so as to expose the top surface of the top shield 16A, and selectively etch the insulating film 64 so as to expose the top surface 41Ba of the connection section 41. The photoresist mask is then removed.

Figure 17:
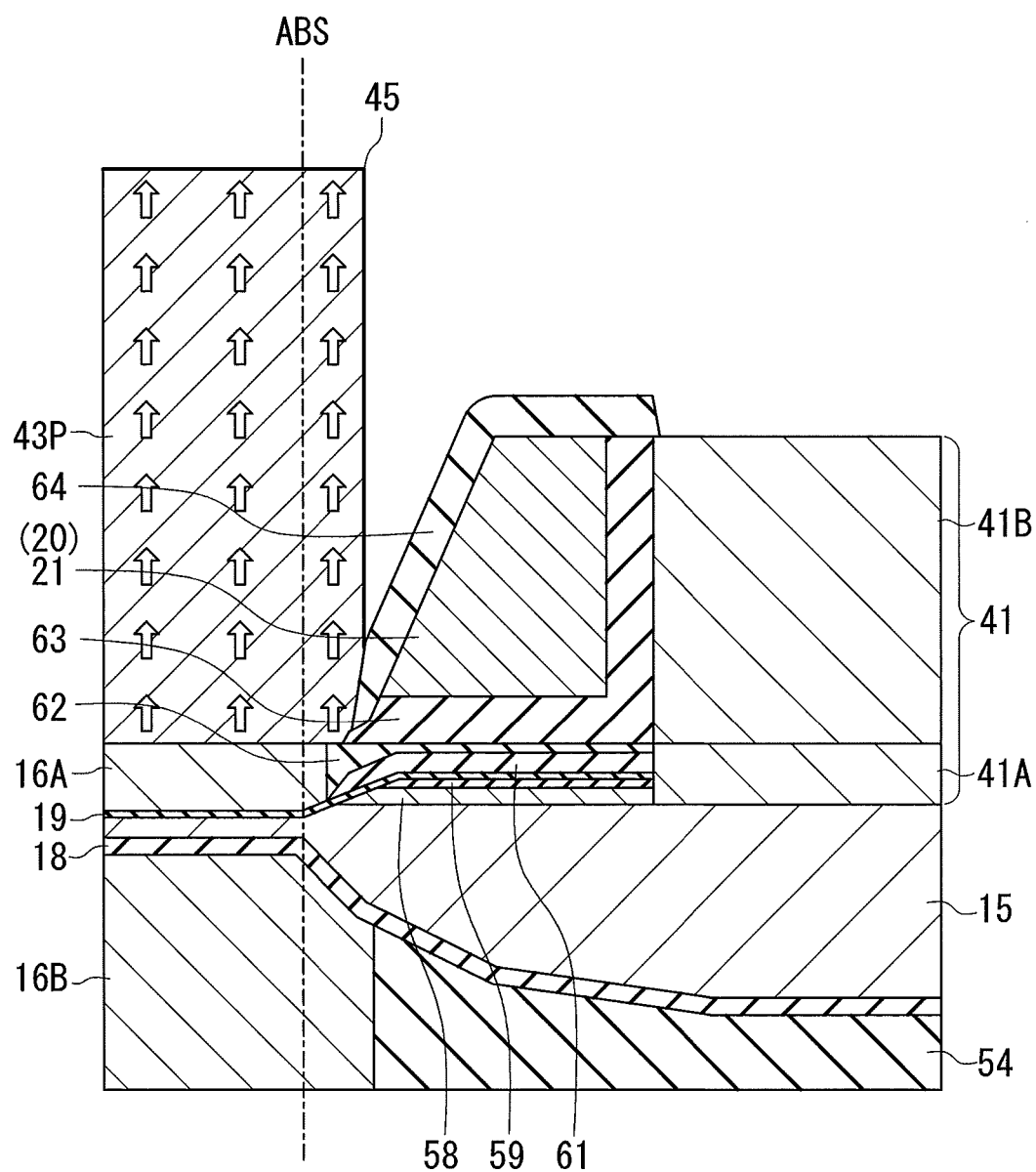
FIG. 17 is a cross-sectional view showing a step that follows the step shown in FIG. 16.

FIG. 17 shows the next step. In this step, a first magnetic layer 43P is formed by plating on the top shield 16A and the nonmagnetic layer 62. The first magnetic layer 43P is formed of the first magnetic material and includes the first portion 43. In FIG. 17, the hollow arrows indicate the crystal growth direction of the first magnetic layer 43P. A region that lies below the first magnetic layer 43P and coincides with the first magnetic layer 43P when viewed in the direction perpendicular to the top surface 1a of the substrate 1 does not include any region in which the first coil element 21 is present. In the present embodiment, most part of the underlayer for the first magnetic layer 43P is constituted by the top shield 16A and the nonmagnetic layer 62 whose top surfaces are even with each other. Thus, most part of the first magnetic layer 43P has a crystal growth direction perpendicular to the top surface 1a of the substrate 1, and most part of the first portion 43 included in the first magnetic layer 43P also has the same crystal growth direction. The first magnetic layer 43P may be formed such that a part thereof rides over the insulating film 64. A part of the first magnetic layer 43P including the surface of the first magnetic layer 43P is oxidized into an oxide film after the formation of the first magnetic layer 43P. In FIG. 17, the oxide film is shown by thick lines. The first intermediate film 45 is formed of a part of the oxide film. The first portion 43 is formed of a main part of the first magnetic layer 43P, i.e., the first magnetic layer 43P excluding the part to become the oxide film.

Figure 18:
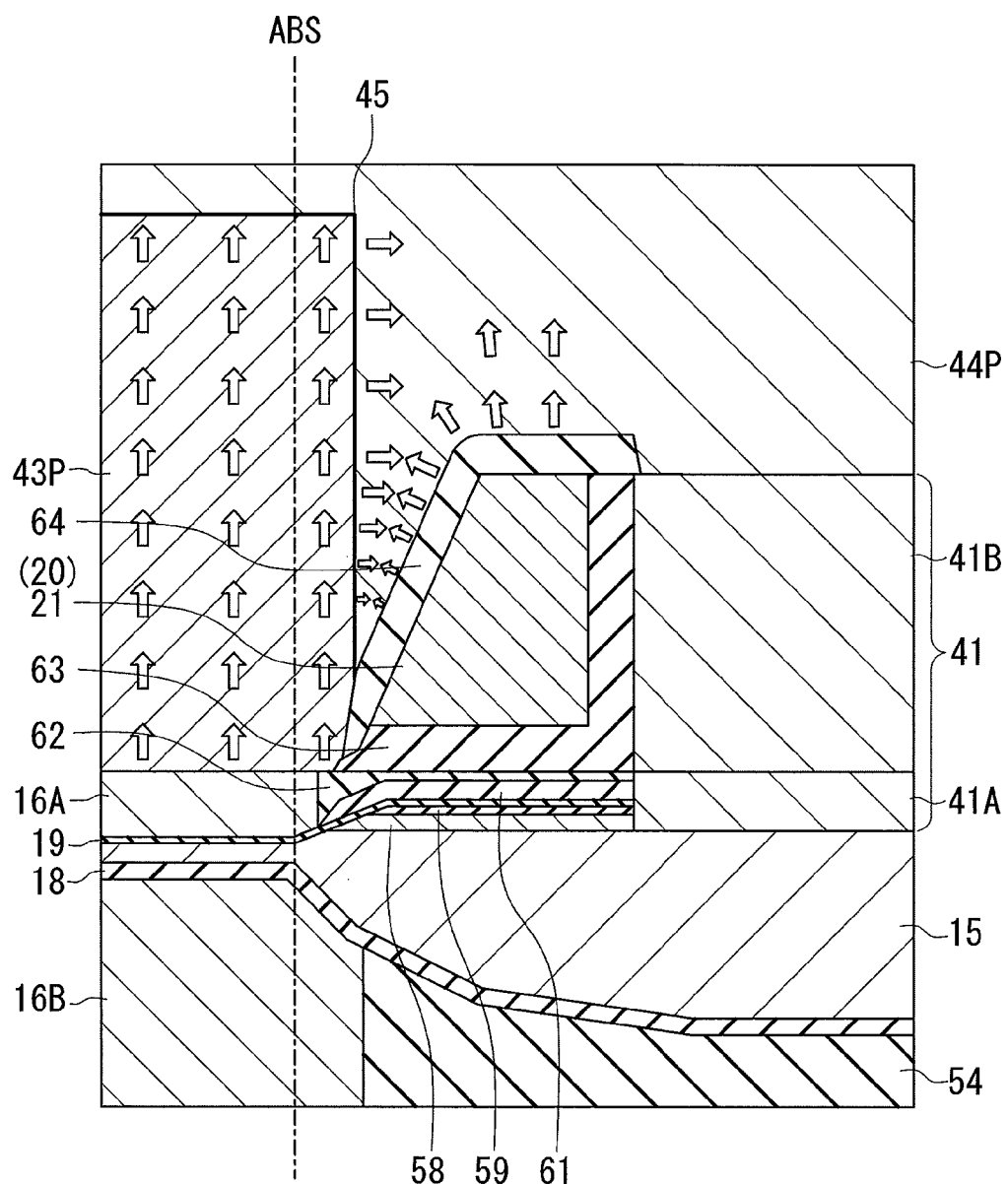
FIG. 18 is a cross-sectional view showing a step that follows the step shown in FIG. 17.

FIG. 18 shows the next step. In this step, first, a second magnetic layer 44P is formed by plating on the connection section 41 and the insulating film 64. The second magnetic layer 44P is formed of the second magnetic material and includes the second portion 44. In FIG. 18, the hollow arrows indicate the crystal growth directions of the first and second magnetic layers 43P and 44P. The second magnetic layer 44P is formed such that a part thereof rides over the first magnetic layer 43P. Next, the non-illustrated nonmagnetic layer is formed over the entire top surface of the stack. The second magnetic layer 44P, the oxide film and the non-illustrated nonmagnetic layer are then polished by, for example, CMP, until the main part of the first magnetic layer 43P is exposed. This polishing makes the second magnetic layer 44P into the second portion 44.

Steps to follow the step of FIG. 18 will now be described with reference to FIG. 2 and FIG. 3. First, the protective layer 65 is formed to cover the entire top surface of the stack. Wiring; terminals and other components are then formed on the protective layer 65, and the substrate 1 is cut near the location at which the medium facing surface 80 is to be formed. Then, the cut surface is polished to form the medium facing surface 80 so that the first magnetic layer 43P becomes the first portion 43. The first return path section 40 is thereby completed. Then, fabrication of flying rails and other processes are performed to complete the magnetic head.

If a magnetic material having a high saturation flux density is used to form the first portion 43, the end face 43a of the first portion 43 becomes more likely to protrude relative to the surface of its surrounding portion when the medium facing surface 80 is formed by polishing. As a result, the end face 15a of the main pole 15 cannot be brought close to the recording medium 90. To avoid this, the first magnetic material used to form the first portion 43 preferably has a somewhat low saturation flux density. On the other hand, if the entirety of the first return path section 40 is formed of a magnetic material having a low saturation flux density, the first return path section 40 is unable to perform its function effectively. To cope with this, in the present embodiment the second portion 44 is formed of the second magnetic material having a saturation flux density higher than that of the first magnetic material. The first return path section 40 is thus able to perform its function effectively.

The manufacturing method for the magnetic head according to the present embodiment forms the top shield 16A, the initial connection section 41P, the initial insulating film 63P and the initial coil element 21P in this order and then performs the polishing step of polishing the initial coil element 21P, the initial insulating film 63P and the initial connection section 41P. Thereafter, the etching step is performed to provide the initial coil element 21P with the front end face 21a and thereby make the initial coil element 21P into the first coil element 21. If a part of the top shield 16A is etched in the course of etching the initial coil element 21P, the top shield 16A becomes smaller in volume and the function of the write shield 16 is thereby impaired. More specifically, if the top shield 16A becomes smaller in volume, saturation of magnetic flux occurs in the top shield 16A and as a result, the magnetic flux leaks from the top shield 16A toward the medium facing surface 80 to induce unwanted erasure. In the present embodiment, in contrast, the initial insulating film 63P is formed to cover the top shield 16A and the initial connection section 41P, and before the etching step, a part of the insulating film 63 is interposed between the top shield 16A and the initial coil element 21P. Thus, according to the present embodiment, the part of the insulating film 63 serves to prevent the top shield 16A from being partly etched in the course of etching the initial coil element 21P. This makes it possible to prevent the occurrence of unwanted erasure.

In the etching step, the insulating film 63 is partly etched so that a portion of the insulating film 63 remains on the top shield 16A. If the level of the top surface of the initial coil element 21P prior to the etching step varies, the location of the front end face 21a of the first coil element 21 and the etching amount of the portion of the insulating film 63 lying on the top shield 16A would also vary. If the insulating film 63 lying on the top shield 16A is completely removed, the top shield 16A would be partly etched. In contrast, according to the present embodiment; the polishing step performed before the etching step allows accurate definition of the level of the top surface of the initial coil element 21P prior to the etching step. This also serves to prevent the top shield 16A from being partly etched, thus making it possible to prevent the occurrence of unwanted erasure.

In the present embodiment, the first coil element 21 is completed after the completion of the connection section 41. Supposing that the connection section 41 is to be completed by forming the second layer 41B thereof after the completion of the first coil element 21, the following steps must be followed. First, after the step of FIG. 8, the insulating film 63, the first coil element 21 (the first coil portion 20) and the insulating film 64 are formed in this order, and then the insulating films 63 and 64 are etched by, for example, IBE or reactive ion etching using a photoresist mask so that the top surface of the first layer 41A of the connection section 41 is exposed. Then, the second layer 41B is formed on the first layer 41A. In this case, it is necessary to make the distance between the first coil element 21 and the second layer 41B large to some extent in consideration of a margin for a misalignment of the photoresist mask. Accordingly, in this case, the end face of the second layer 41B facing toward the medium facing surface 80 becomes farther from the medium facing surface 80 by the margin, and the magnetic path passing through the first return path section 40 becomes longer. According to the present embodiment, in contrast, the first coil element 21 is formed in a self-aligned manner with a predetermined distance from the second layer 41B defined by the thickness of the insulating film 63. The distance between the the first coil element 21 and the second layer 41B is defined by the thickness of the insulating film 63 without the need for the aforementioned margin. The present embodiment thus allows the magnetic path passing through the first return path section 40 to be smaller in length. As a result, it is possible to shorten the rise time of the write current flowing through the coil.

Second Embodiment

Figure 19:
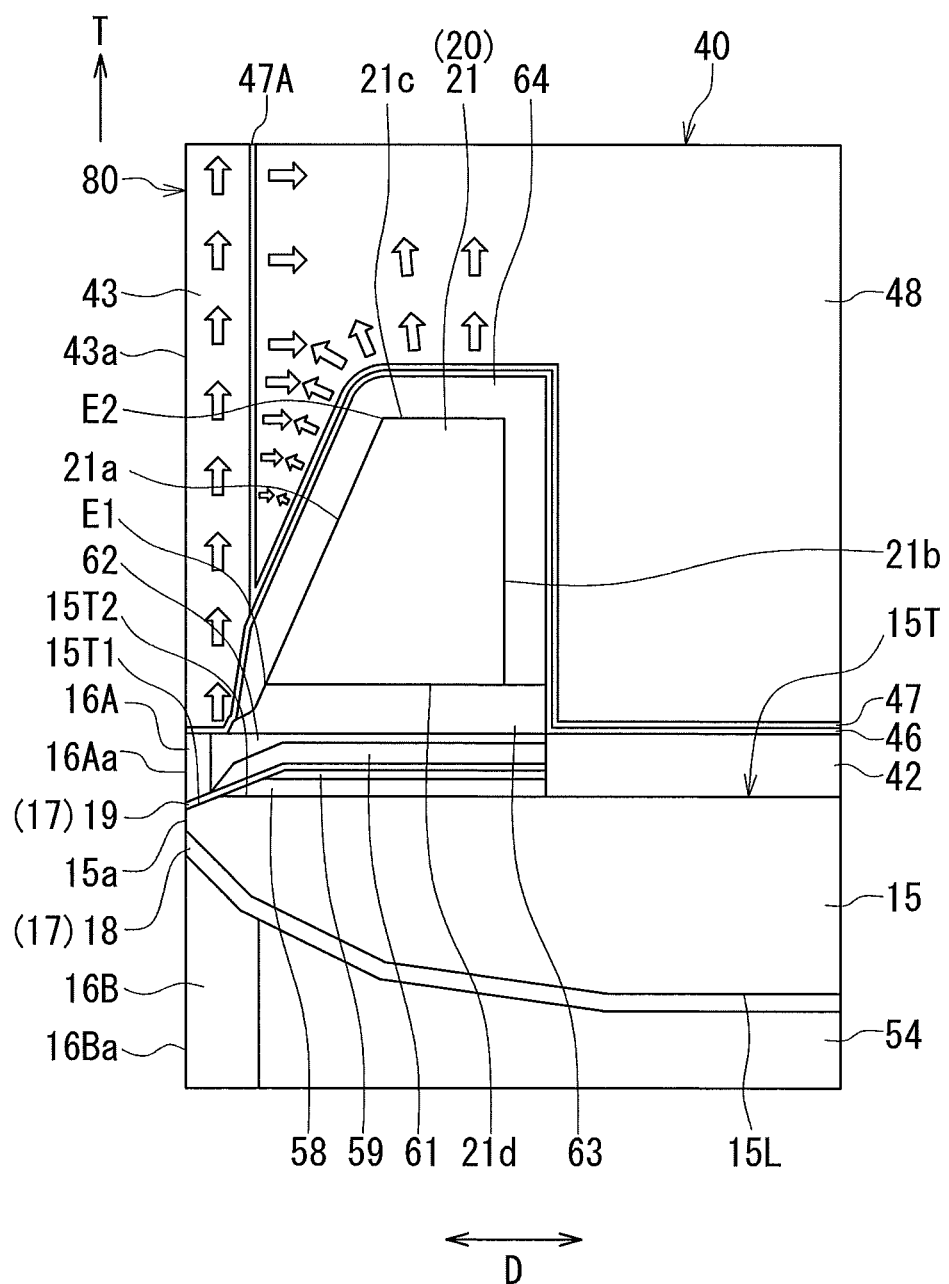
FIG. 19 is a cross-sectional view showing the main part of a magnetic head according to a second embodiment of the invention.

A magnetic head according to a second embodiment of the present invention will now be described with reference to FIG. 19. FIG. 19 is a cross-sectional view showing the main part of the magnetic head according to the present embodiment. FIG. 19 shows a cross section perpendicular to the medium facing surface and to the top surface of the substrate, particularly the main cross section. The arrow labeled Tin FIG. 19 indicates the direction of travel of the recording medium.

The magnetic head according to the present embodiment differs from the magnetic head according to the first embodiment in the following ways. In the present embodiment, the nonmagnetic layer 67 is not provided. Further, the first return path section 40 of the present embodiment includes a second portion 48, a connection section 42, an electrode film 46 formed of a nonmagnetic metal material, and a nonmagnetic film 47 formed of a nonmagnetic material, in place of the second portion 44, the connection section 41 and the first intermediate film 45 of the first embodiment. The second portion 48 is formed of the second magnetic material described in relation to the first embodiment. The connection section 42 is formed of the third magnetic material described in relation to the first embodiment. The connection section 42 is shaped and located in the same manner as the first layer 41A of the connection section 41 of the first embodiment.

The electrode film 46 is disposed to cover the top shield 16A, the connection section 42, the nonmagnetic layer 62 and the insulating film 64. In the present embodiment, the insulating film 64 extends to be in contact with the front end face 21a, the rear end face 21b and the top surface 21c of the first coil element 21. The insulating film 63 extends to be in contact with the bottom surface 21d of the first coil element 21. The electrode film 46 is used as an electrode and a seed in forming the first and second portions 43 and 48 by plating. The electrode film 46 has a thickness in the range of 20 to 70 nm, for example.

As described in relation to the first embodiment, the first portion 43 lies on the top shield 16A and the nonmagnetic layer 62. In the present embodiment, a part of the first portion 43 rides over the insulating film 64. The electrode film 46 is interposed between the first portion 43 and each of the top shield 16A, the nonmagnetic layer 62 and the insulating film 64.

The nonmagnetic layer 47 is disposed to extend along the surfaces of the first portion 43 and the electrode film 46. An example of the nonmagnetic material used to form the nonmagnetic film 47 is a nonmagnetic metal material such as Ru. The nonmagnetic film 47 has a thickness in the range of 0.1 to 1 nm, for example.

The second portion 48 lies on the nonmagnetic film 47. The second portion 48 is the same as the second portion 44 of the first embodiment in the positional relationship with the first portion 43 and the first coil element 21.

The nonmagnetic film 47 includes a first intermediate film 47A interposed between the first portion 43 and the second portion 48. Since the nonmagnetic film 47 is part of the first return path section 40, the first return path section 40 can be said to include the first intermediate film 47A. The thickness of the first intermediate film 47A in the direction D perpendicular to the medium facing surface 80 is smaller than the maximum thickness of the first portion 43 in the direction D perpendicular to the medium facing surface 80.

As will be described in detail later, the first and second portions 43 and 48 are formed by plating, like the first and second portions 43 and 44 of the first embodiment. In FIG. 19, the hollow arrows indicate the crystal growth directions of the first and second portions 43 and 48 formed by plating. As shown in FIG. 19, most part of the first portion 43 has a crystal growth direction perpendicular to the top surface 1a (see FIG. 2 and FIG. 3) of the substrate 1. The second portion 48 includes a portion having a crystal growth direction perpendicular to the front end face 21a of the first coil element 21 and portions having other crystal growth directions. Like the first embodiment, the present embodiment prevents the occurrence of leakage magnetic field from the end face 43a of the first portion 43 toward the outside of the medium facing surface 80, and prevents the second portion 48 from becoming a cause of leakage magnetic field. The present embodiment thus makes it possible to prevent the occurrence of unwanted erasure.

In the present embodiment, the first intermediate film 47A formed of a nonmagnetic material is interposed between the first portion 43 and the second portion 48. Thus, the magnetization of the first portion 43 is less likely to be oriented in the direction D perpendicular to the medium facing surface 80. According to the present embodiment, this also serves to prevent the occurrence of unwanted erasure.

A manufacturing method for the magnetic head according to the present embodiment will now be described with reference to FIG. 19. The manufacturing method for the magnetic head according to the present embodiment is the same as the method according to the first embodiment up to the step shown in FIG. 8. In the present embodiment, however, the connection section 42 is formed in place of the first layer 41A of the connection section 41 of the first embodiment. In the present embodiment, the insulating film 63 is then formed over the entire top surface of the stack by atomic layer deposition, for example. The insulating film 63 is then selectively etched to form therein an opening for exposing the top surface of the third connection layer. Next, an initial coil portion including an initial coil element is formed by frame plating, for example.

Next, a first photoresist mask is formed on the top surface of the stack. Then, using the first photoresist mask as an etching mask, the initial coil element and the insulating film 63 are etched in part by, for example, IBE so as to provide the initial coil element with the front end face 21a of the first coil element 21. This makes the initial coil element into the first coil element 21, thus making the initial coil portion into the first coil portion 20. The first photoresist mask is then removed.

Next, the insulating film 64 is formed over the entire top surface of the stack by atomic layer deposition, for example. A second photoresist mask is then formed on the top surface of the stack. The second photoresist mask does not cover a part of the top surface of the stack located above the top surface of the top shield 16A and a part of the top surface of the stack located above the top surface of the connection section 42. Then, using the second photoresist mask as an etching mask, the insulating films 63 and 64 are selectively etched by, for example, IBE, so as to expose the top surface of the top shield 16A and the top surface of the connection section 42. The second photoresist mask is then removed.

Figure 20:
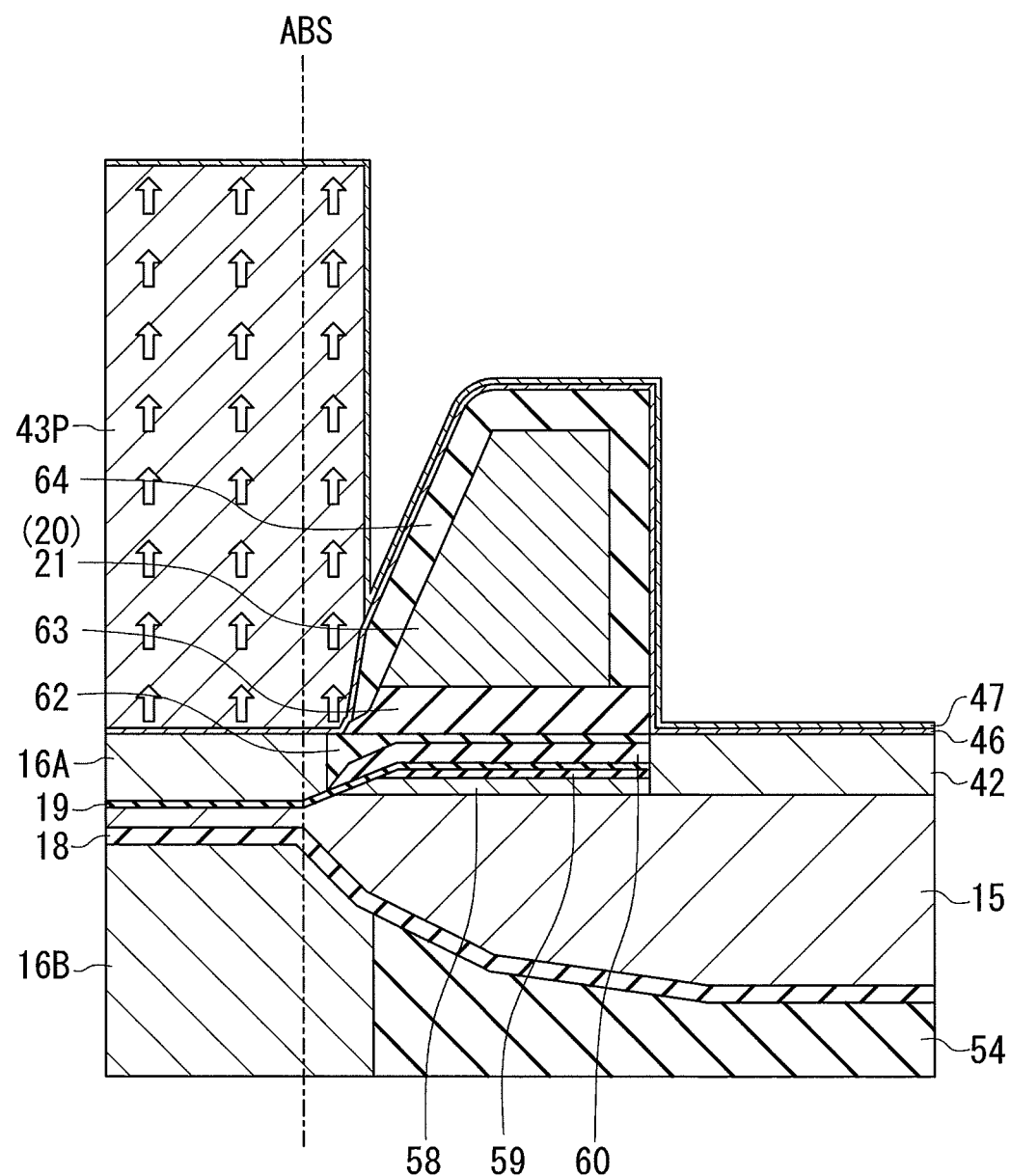
FIG. 20 is a cross-sectional view showing a step of a manufacturing method for the magnetic head according to the second embodiment of the invention.
Figure 21:
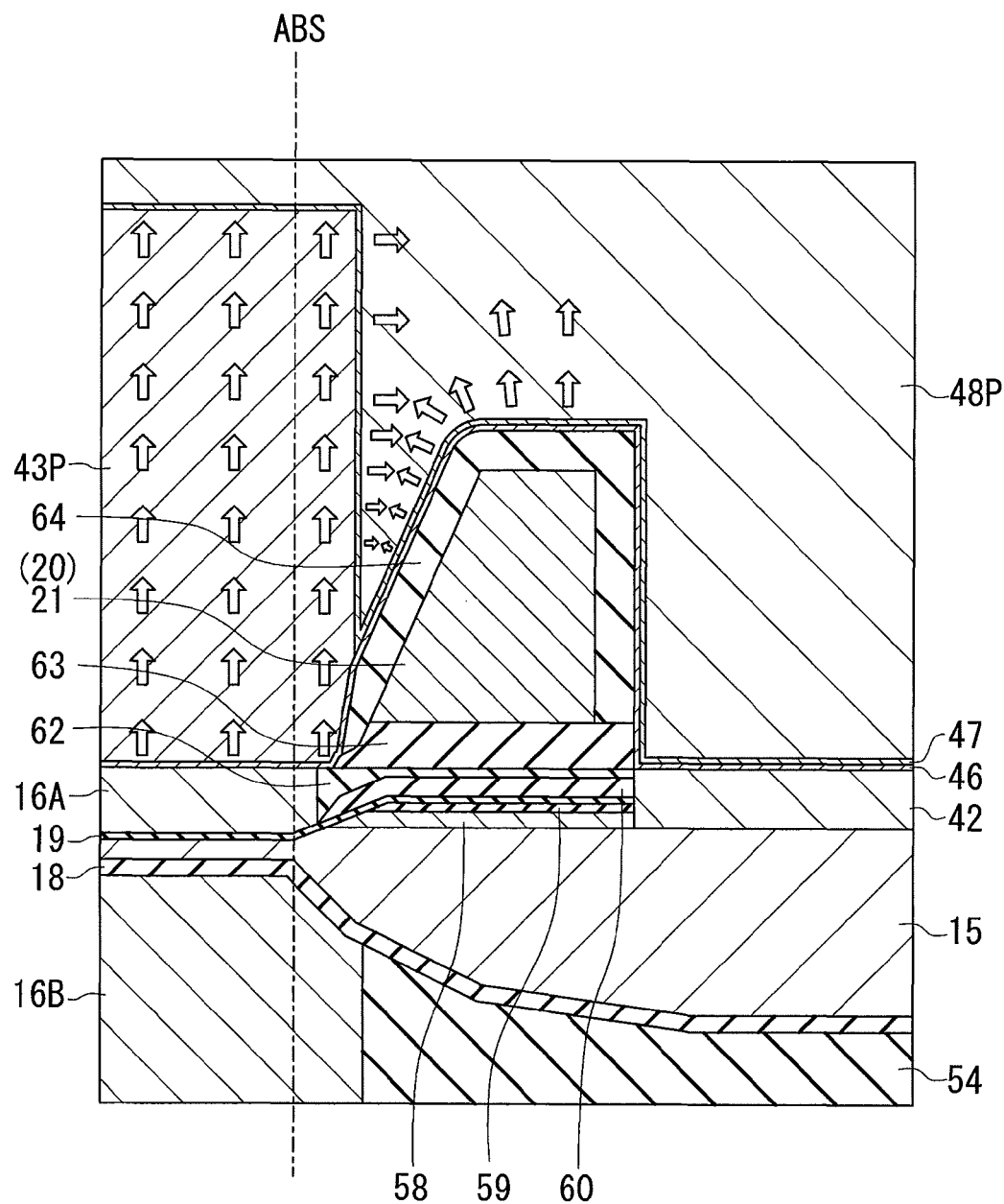
FIG. 21 is a cross-sectional view showing a step that follows the step shown in FIG. 20.

Reference is now made to FIGS. 20 and 21 to describe a series of steps to be performed after the foregoing step up to the formation of the second portion 48. FIGS. 20 and 21 each illustrate a stack of layers formed in the process of manufacturing the magnetic head. FIGS. 20 and 21 show a cross section perpendicular to the medium facing surface 80 and to the top surface 1a of the substrate 1, particularly the main cross section. In FIGS. 20 and 21, the symbol "ABS" indicates the location at which the medium facing surface 80 is to be formed. FIGS. 20 and 21 omit the illustration of parts located below the bottom shield 16B and the nonmagnetic layer 54.

In the step shown in FIG. 20, first, the electrode film 46 is formed over the entire top surface of the stack. Then, a first magnetic layer 43P is formed on the electrode film 46 by plating, using the electrode film 46 as an electrode and a seed. The first magnetic layer 43P is formed of the first magnetic material and includes the first portion 43. In FIG. 20, the hollow arrows indicate the crystal growth direction of the first magnetic layer 43P. A region that lies below the first magnetic layer 43P and coincides with the first magnetic layer 43P when viewed in the direction perpendicular to the top surface 1a of the substrate 1 does not include any region in which the first coil element 21 is present. In the present embodiment, most part of the underlayer for the first magnetic layer 43P is constituted by the top shield 16A and the nonmagnetic layer 62 whose top surfaces are even with each other. Thus, most part of the first magnetic layer 43P has a crystal growth direction perpendicular to the top surface 1a of the substrate 1, and most part of the first portion 43 included in the first magnetic layer 43P also has the same crystal growth direction. The first magnetic layer 43P may be formed such that a part thereof rides over the insulating film 64. Next, the nonmagnetic film 47 including the first intermediate film 47A is formed over the entire top surface of the stack.

FIG. 21 shows the next step. In this step, first, a second magnetic layer 48P is formed by plating on the nonmagnetic film 47. The second magnetic layer 48P is formed of the second magnetic material and includes the second portion 48. In FIG. 21, the hollow arrows indicate the crystal growth directions of the first and second magnetic layers 43P and 48P. The second magnetic layer 48P is formed such that a part thereof rides over the first magnetic layer 43P. Next, the non-illustrated nonmagnetic layer is formed over the entire top surface of the stack. The nonmagnetic film 47, the second magnetic layer 48P and the non-illustrated nonmagnetic layer are then polished by, for example, CMP, until the first magnetic layer 43P is exposed. This polishing makes the second magnetic layer 48P into the second portion 48. The subsequent steps are the same as those in the first embodiment.

The present embodiment cannot provide the effects resulting from the method of forming the top shield 16A, the first coil element 21, the insulating film 63 and the connection section 41 described in relation to the first embodiment. The remainder of configuration, function and effects of the present embodiment are similar to those of the first embodiment.

Third Embodiment

Figure 22:
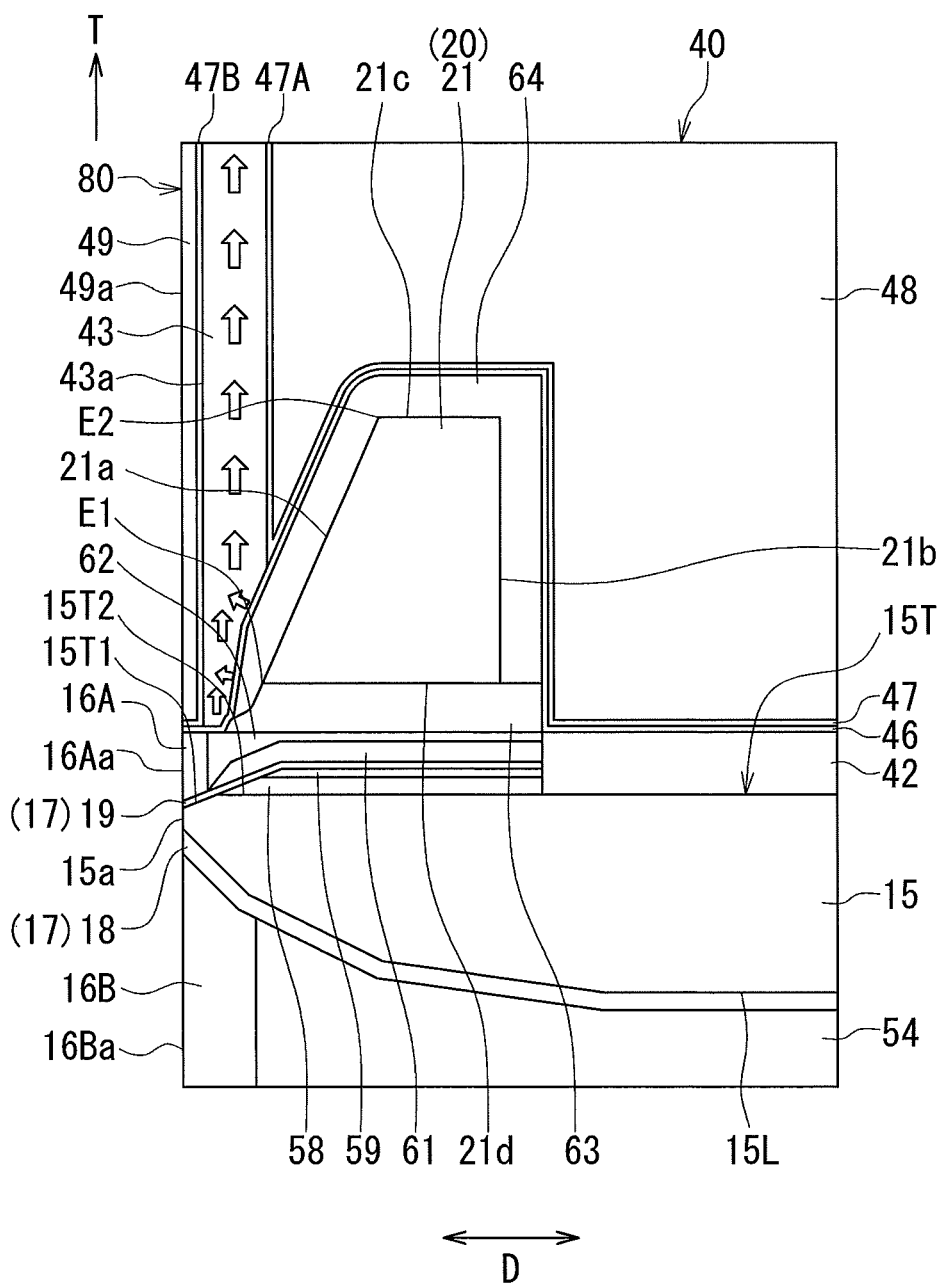
FIG. 22 is a cross-sectional view showing the main part of a magnetic head according to a third embodiment of the invention.

A magnetic head according to a third embodiment of the invention will now be described with reference to FIG. 22. FIG. 22 is a cross-sectional view showing the main part of the magnetic head according to the present embodiment. FIG. 22 shows a cross section perpendicular to the medium facing surface and to the top surface of the substrate, particularly the main cross section. The arrow labeled T in FIG. 22 indicates the direction of travel of the recording medium.

The magnetic head according to the present embodiment differs from the magnetic head according to the second embodiment in the following ways. The first return path section 40 of the present embodiment includes a third portion 49 in addition to the first portion 43, the second portion 48, the connection section 42, the electrode film 46 and the nonmagnetic film 47. The third portion 49 is formed of the second magnetic material described in relation to the first embodiment. In FIG. 22, the hollow arrows indicate the crystal growth directions of the first portion 43.

The third portion 49 lies on the top shield 16A and is interposed between the medium facing surface 80 and the first portion 43. The third portion 49 has an end face 49a located in the medium facing surface 80. In the present embodiment, the end face 43a of the first portion 43 is located at a distance from the medium facing surface 80. The electrode film 46 and the nonmagnetic film 47 are interposed between the top shield 16A and the third portion 49.

The nonmagnetic film 47 includes a second intermediate film 47B in addition to the first intermediate film 47A. The second intermediate film 47B is interposed between the first portion 43 and the third portion 49. Since the nonmagnetic film 47 is part of the first return path section 40, the first return path section 40 can be said to include the second intermediate film 47B.

The thickness of each of the third portion 49 and the second intermediate film 47B in the direction D perpendicular to the medium facing surface 80 is smaller than the maximum thickness of the first portion 43 in the direction D perpendicular to the medium facing surface 80. Thus, the magnetization of the third portion 49 is less likely to be oriented in the direction D perpendicular to the medium facing surface 80. According to the present embodiment, it is thus possible to prevent the occurrence of unwanted erasure.

Figure 23:
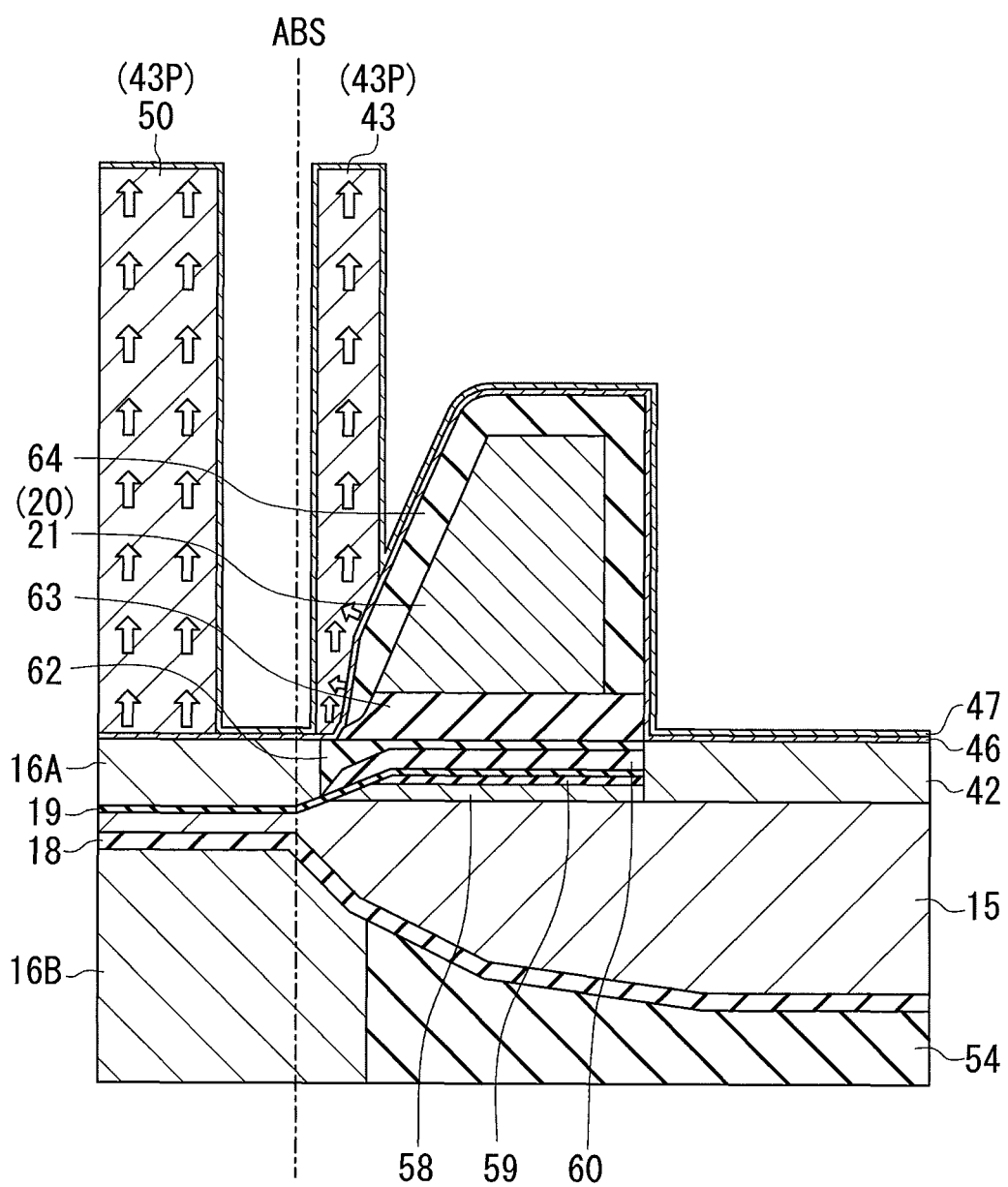
FIG. 23 is a cross-sectional view showing a step of a manufacturing method for the magnetic head according to the third embodiment of the invention.
Figure 24:
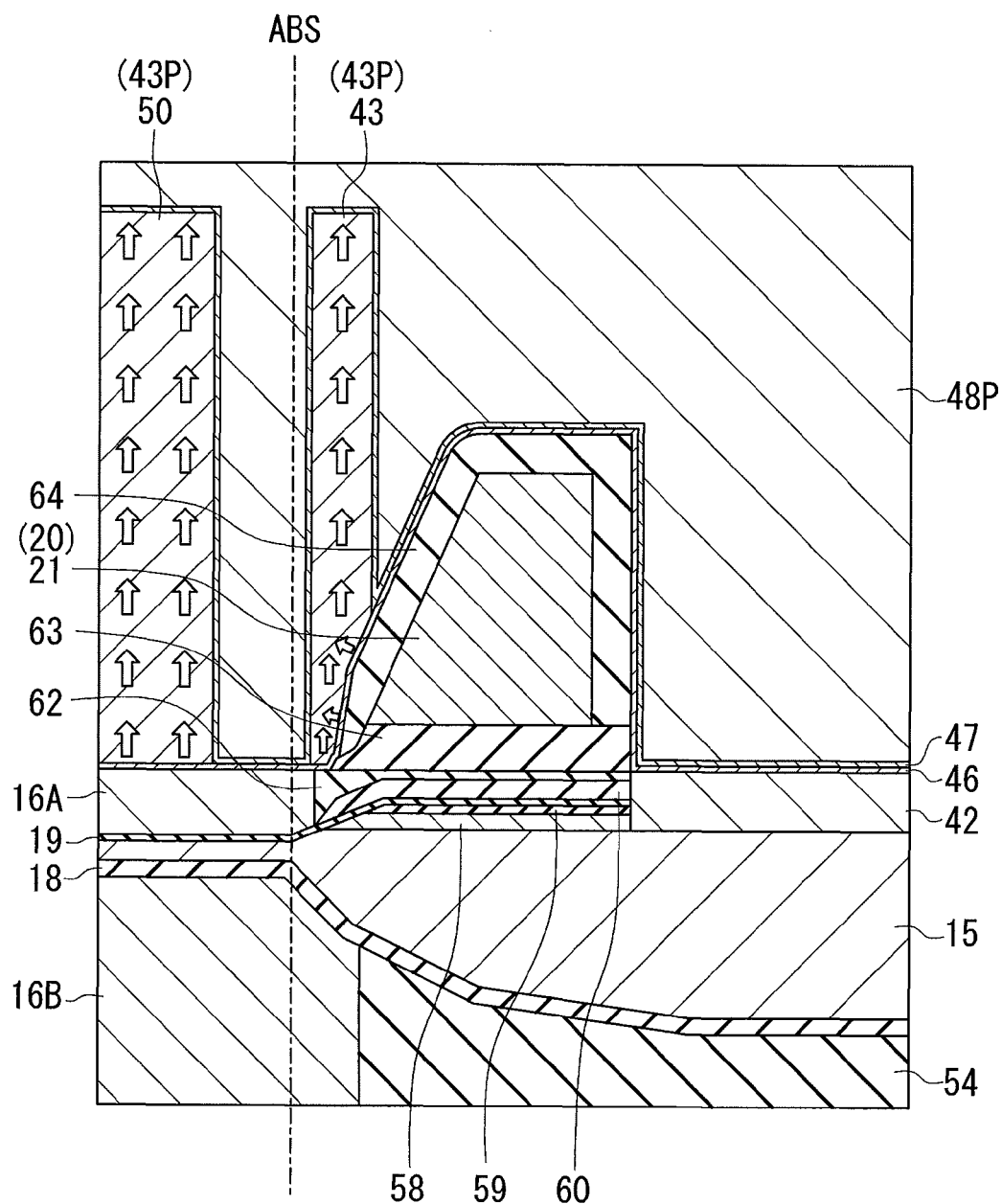
FIG. 24 is a cross-sectional view showing a step that follows the step shown in FIG. 23.

A manufacturing method for the magnetic head according to the present embodiment will now be described with reference to FIGS. 23 and 24. FIGS. 23 and 24 each illustrate a stack of layers formed in the process of manufacturing the magnetic head. FIGS. 23 and 24 show a cross section perpendicular to the medium facing surface 80 and to the top surface 1a of the substrate 1, particularly the main cross section. In FIGS. 23 and 24, the symbol "ABS" indicates the location at which the medium facing surface 80 is to be formed. FIGS. 23 and 24 omit the illustration of parts located below the bottom shield 16B and the nonmagnetic layer 54.

The manufacturing method for the magnetic head according to the present embodiment is the same as the method according to the second embodiment up to the step of forming the electrode film 46 of the second embodiment (see FIG. 20). FIG. 23 shows the next step. In this step, first, a first magnetic layer 43P is formed on the electrode film 46 by plating, using the electrode film 46 as an electrode and a seed. The first magnetic layer 43P is formed of the first magnetic material and includes the first portion 43 and a columnar portion 50. In FIG. 23, the hollow arrows indicate the crystal growth directions of the first magnetic layer 43P. The columnar portion 50 is at a predetermined distance from the first portion 43 and lies in a region that will be removed in the step of forming the medium facing surface 80 to be performed later. Then, the nonmagnetic film 47 is formed over the entire top surface of the stack.

FIG. 24 shows the next step. In this step, first, a second magnetic layer 48P is formed on the nonmagnetic film 47 by plating. The second magnetic layer 48P is formed of the second magnetic material and includes the second portion 48 and the third portion 49. The second magnetic layer 48P is formed such that a part thereof rides over the first portion 43 and the columnar portion 50. Next, the non-illustrated nonmagnetic layer is formed over the entire top surface of the stack. The nonmagnetic film 47, the second magnetic layer 48P and the non-illustrated nonmagnetic layer are then polished by, for example, CMP, until the first portion 43 and the columnar portion 50 are exposed. A portion of the polished second magnetic layer 48P that lies above the first coil element 21 and the connection section 42 makes the second portion 48.

Next, the protective layer 65 (see FIG. 2 and FIG. 3) is formed to cover the entire top surface of the stack. Wiring, terminals and other components are then formed on the protective layer 65, and the substrate 1 is cut near the location at which the medium facing surface 80 is to be formed. Then, the cut surface is polished to form the medium facing surface 80 so that a portion of the second magnetic layer 48P that lies between the first portion 43 and the columnar portion 50 becomes the third portion 49. The first return path section 40 is thereby completed. Then, fabrication of flying rails and other processes are performed to complete the magnetic head.

The remainder of configuration, function and effects of the present embodiment are similar to those of the second embodiment.

The present invention is not limited to the foregoing embodiments, and various modifications may be made thereto. For example, as far as the requirements of the appended claims are met, the shape and location of the first coil element 21 of the coil and the shapes and locations of the first portion 43, the second portion 44 or 48 and the third portion 49 of the first return path section 40 may be freely chosen, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:
   a medium facing surface configured to face a recording medium;
   a coil for producing a magnetic field corresponding to data to be written on the recording medium;
   a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;
   a write shield formed of a magnetic material;
   a gap section formed of a nonmagnetic material and located between the main pole and the write shield; and
   a first return path section located on a front side in a direction of travel of the recording medium relative to the main pole, the first return path section connecting the write shield to a part of the main pole located away from the medium facing surface so that a first space is defined by the main pole, the gap section, the write shield, and the first return path section, the first return path section including:
      a first portion formed of a first magnetic material;
      a second portion formed of a second magnetic material, the second portion being located farther from the medium facing surface than is the first portion; and
      a first intermediate film interposed between the first portion and the second portion, a thickness of the first intermediate film in a direction perpendicular to the medium facing surface being smaller than a maximum thickness of the first portion in the direction perpendicular to the medium facing surface, and no portion of the first intermediate film being in the medium facing surface,
   wherein the coil includes a first coil element extending to pass through the first space,
   the first coil element has a front end face facing toward the medium facing surface,
   at least part of the first portion of the first return path section is interposed between the medium facing surface and the front end face of the first coil element, and
   at least part of the second portion of the first return path section is interposed between the first portion of the first return path section and the front end face of the first coil element.

2. The magnetic head for perpendicular magnetic recording according to claim 1, wherein the first intermediate film contains an element constituting the first magnetic material and oxygen.

3. The magnetic head for perpendicular magnetic recording according to claim 1, wherein the first intermediate film is formed of a nonmagnetic material.

4. The magnetic head for perpendicular magnetic recording according to claim 1, wherein the second magnetic material is higher in saturation flux density than the first magnetic material.

5. The magnetic head for perpendicular magnetic recording according to claim 1, wherein the write shield includes a top shield located on the front side in the direction of travel of the recording medium relative to the main pole, and the first portion of the first return path section is located on the front side in the direction of travel of the recording medium relative to the top shield.

6. The magnetic head for perpendicular magnetic recording according to claim 1, wherein the front end face of the first coil element has a first end closest to the main pole and a second end opposite to the first end, and the front end face is inclined with respect to the medium facing surface and the direction perpendicular to the medium facing surface such that the second end is at a greater distance from the medium facing surface than is the first end.

7. The magnetic head for perpendicular magnetic recording according to claim 1, wherein the first return path section further includes a third portion and a second intermediate film, the third portion being formed of the second magnetic material and interposed between the medium facing surface and the first portion, the second intermediate film being interposed between the first portion and the third portion, and a thickness of each of the third portion and the second intermediate film in the direction perpendicular to the medium facing surface is smaller than the maximum thickness of the first portion in the direction perpendicular to the medium facing surface.

8. The magnetic head for perpendicular magnetic recording according to claim 1, further comprising a second return path section formed of a magnetic material and located on a rear side in the direction of travel of the recording medium relative to the main pole, wherein the second return path section connects the write shield to a part of the main pole located away from the medium facing surface so that a second space is defined by the main pole, the gap section, the write shield and the second return path section, and the coil includes a second coil element extending to pass through the second space.

9. The magnetic head for perpendicular magnetic recording according to claim 1, wherein the write shield includes a top shield located on the front side in the direction of travel of the recording medium relative to the main pole, the first portion of the first return path section is located on the front side in the direction of travel of the recording medium relative to the top shield, the front end face of the first coil element has a first end closest to the main pole and a second end opposite to the first end, the front end face is inclined with respect to the medium facing surface and the direction perpendicular to the medium facing surface such that the second end is at a greater distance from the medium facing surface than is the first end, the first return path section further includes a connection section having a columnar shape and connecting the second portion to the part of the main pole located away from the medium facing surface, the magnetic head further comprises an insulating film interposed between the connection section and the first coil element and between the main pole and the first coil element, and the first coil element, the insulating film and the connection section have respective top surfaces coplanar with each other.

10. A manufacturing method for the magnetic head for perpendicular magnetic recording of claim 1, comprising steps of:

forming the coil;
forming the main pole;
forming the write shield;
forming the gap section; and
forming the first return path section, which includes:
    forming a first magnetic layer by plating, the first magnetic layer being formed of the first magnetic material and including the first portion; and
    forming a second magnetic layer by plating after the first magnetic layer is formed, the second magnetic layer being formed of the second magnetic material and including the second portion.

11. The manufacturing method for the magnetic head for perpendicular magnetic recording according to claim 10, wherein the first intermediate film contains an element constituting the first magnetic material and oxygen, and the first intermediate film is formed by oxidation of a part of the first magnetic layer after the first magnetic layer is formed, the part of the first magnetic layer including a surface of the first magnetic layer.

12. The manufacturing method for the magnetic head for perpendicular magnetic recording according to claim 10, wherein the first intermediate film is formed of a nonmagnetic material, and the step of forming the first return path section further includes forming the first intermediate film between the step of forming the first magnetic layer and the step of forming the second magnetic layer.

13. The manufacturing method for the magnetic head for perpendicular magnetic recording according to claim 10, wherein the first return path section further includes a third portion and a second intermediate film, the third portion being formed of the second magnetic material and interposed between the medium facing surface and the first portion, the second intermediate film being interposed between the first portion and the third portion, a thickness of each of the third portion and the second intermediate film in the direction perpendicular to the medium facing surface is smaller than the maximum thickness of the first portion in the direction perpendicular to the medium facing surface, and the second magnetic layer is formed to include the third portion.

14. The manufacturing method for the magnetic head for perpendicular magnetic recording according to claim 10, wherein the write shield includes a top shield located on the front side in the direction of travel of the recording medium relative to the main pole, the first portion of the first return path section is located on the front side in the direction of travel of the recording medium relative to the top shield, the front end face of the first coil element has a first end closest to the main pole and a second end opposite to the first end, the front end face is inclined with respect to the medium facing surface and the direction perpendicular to the medium facing surface such that the second end is at a greater distance from the medium facing surface than is the first end, the first return path section further includes a connection section having a columnar shape and connecting the second portion to the part of the main pole located away from the medium facing surface, the magnetic head further comprises an insulating film interposed between the connection section and the first coil element and between the main pole and the first coil element, the first coil element, the insulating film and the connection section have respective top surfaces coplanar with each other, the step of forming the write shield includes forming the top shield after the step of forming the main pole, and the step of forming the first return path section further includes forming an initial connection section after forming the top shield, the manufacturing method for the magnetic head further comprising forming an initial insulating film to cover the top shield and the initial connection section after forming the initial connection section, wherein the step of forming the coil includes:
  forming an initial coil element after forming the initial insulating film;
  polishing the initial coil element, the initial insulating film and the initial connection section so that the initial insulating film becomes the insulating film, the initial connection section becomes the connection section, and top surfaces of the initial coil element, the insulating film and the connection section become even with each other; and
  etching the initial coil element to provide the initial coil element with the front end face and thereby make the initial coil element into the first coil element.

15. A magnetic head for perpendicular magnetic recording, comprising:
  a medium facing surface configured to face a recording medium;
  a coil for producing a magnetic field corresponding to data to be written on the recording medium;
  a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;
  a write shield formed of a magnetic material;
  a gap section formed of a nonmagnetic material and located between the main pole and the write shield; and
  a first return path section located on a front side in a direction of travel of the recording medium relative to the main pole, the first return path section connecting the write shield to a part of the main pole located away from the medium facing surface so that a first space is defined by the main pole, the gap section, the write shield, and the first return path section, the first return path section including:
    a first portion formed of a first magnetic material;
    a second portion formed of a second magnetic material, the second portion being located farther from the medium facing surface than is the first portion; and
    a first intermediate film interposed between the first portion and the second portion, a thickness of the first intermediate film in a direction perpendicular to the medium facing surface being smaller than a maximum thickness of the first portion in the direction perpendicular to the medium facing surface, and the first intermediate film containing an element constituting the first magnetic material and oxygen, wherein the coil includes a first coil element extending to pass through the first space, the first coil element has a front end face facing toward the medium facing surface, at least part of the first portion of the first return path section is interposed between the medium facing surface and the front end face of the first coil element, and at least part of the second portion of the first return path section is interposed between the first portion of the first return path section and the front end face of the first coil element.

16. A magnetic head for perpendicular magnetic recording, comprising:
  a medium facing surface configured to face a recording medium;
  a coil for producing a magnetic field corresponding to data to be written on the recording medium;
  a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;
  a write shield formed of a magnetic material;
  a gap section formed of a nonmagnetic material and located between the main pole and the write shield; and
  a first return path section located on a front side in a direction of travel of the recording medium relative to the main pole, the first return path section connecting the write shield to a part of the main pole located away from the medium facing surface so that a first space is defined by the main pole, the gap section, the write shield, and the first return path section, the first return path section including:
    a first portion formed of a first magnetic material;
    a second portion formed of a second magnetic material that is higher in saturation flux density than the first magnetic material, the second portion being located farther from the medium facing surface than is the first portion; and
    a first intermediate film interposed between the first portion and the second portion, a thickness of the first intermediate film in a direction perpendicular to the medium facing surface being smaller than a maximum thickness of the first portion in the direction perpendicular to the medium facing surface, wherein the coil includes a first coil element extending to pass through the first space, the first coil element has a front end face facing toward the medium facing surface, at least part of the first portion of the first return path section is interposed between the medium facing surface and the front end face of the first coil element, and at least part of the second portion of the first return path section is interposed between the first portion of the first return path section and the front end face of the first coil element.

17. A magnetic head for perpendicular magnetic recording, comprising:
  a medium facing surface configured to face a recording medium;

a coil for producing a magnetic field corresponding to data to be written on the recording medium, the coil including a first coil element having a front end face facing toward the medium facing surface;

a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;

a write shield formed of a magnetic material, the write shield including a top shield located on a front side in a direction of travel of the recording medium relative to the main pole;

a gap section formed of a nonmagnetic material and located between the main pole and the write shield;

a first return path section located on the front side in the direction of travel of the recording medium relative to the main pole, the first return path section connecting the write shield to a part of the main pole located away from the medium facing surface so that a first space is defined by the main pole, the gap section, the write shield, and the first return path section, the first return path section including:
  a first portion formed of a first magnetic material, the first portion being located on the front side in the direction of travel of the recording medium relative to the top shield, at least part of the first portion of the first return path section being interposed between the medium facing surface and the front end face of the first coil element;
  a second portion formed of a second magnetic material, the second portion being located farther from the medium facing surface than is the first portion, at least part of the second portion of the first return path section is interposed between the first portion of the first return path section and the front end face of the first coil element;
  a first intermediate film interposed between the first portion and the second portion, a thickness of the first intermediate film in a direction perpendicular to the medium facing surface being smaller than a maximum thickness of the first portion in the direction perpendicular to the medium facing surface; and
  a connection section having a columnar shape and connecting the second portion to the part of the main pole located away from the medium facing surface; and an insulating film interposed between the connection section and the first coil element and between the main pole and the first coil element, the first coil element, the insulating film, and the connection section having respective top surfaces coplanar with each other, wherein the first coil element extends to pass through the first space, the front end face of the first coil element has a first end closest to the main pole and a second end opposite to the first end, and the front end face of the first coil element is inclined with respect to the medium facing surface and the direction perpendicular to the medium facing surface such that the second end is at a greater distance from the medium facing surface than is the first end.

* * * * *